United States Patent
Fujishiro et al.

(10) Patent No.: US 11,012,906 B2
(45) Date of Patent: May 18, 2021

(54) RADIO TERMINAL, PROCESSOR, AND METHOD FOR PERFORMING CELL RESELECTION

(71) Applicant: KYOCERA Corporation, Kyoto (JP)

(72) Inventors: Masato Fujishiro, Yokohama (JP); Hiroyuki Urabayashi, Yokohama (JP); Hiroyuki Adachi, Kawasaki (JP); Henry Chang, San Diego, CA (US)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 16/526,900

(22) Filed: Jul. 30, 2019

(65) Prior Publication Data

US 2019/0380078 A1    Dec. 12, 2019

Related U.S. Application Data

(63) Continuation of application No. PCT/JP2018/003615, filed on Feb. 2, 2018.

(60) Provisional application No. 62/454,185, filed on Feb. 3, 2017.

(51) Int. Cl.
| | |
|---|---|
| *H04W 36/08* | (2009.01) |
| *H04W 76/27* | (2018.01) |
| *H04W 4/06* | (2009.01) |
| *H04W 16/26* | (2009.01) |
| *H04W 36/30* | (2009.01) |
| *H04W 48/20* | (2009.01) |

(52) U.S. Cl.
CPC ............ *H04W 36/08* (2013.01); *H04W 4/06* (2013.01); *H04W 16/26* (2013.01); *H04W 36/30* (2013.01); *H04W 48/20* (2013.01); *H04W 76/27* (2018.02)

(58) Field of Classification Search
CPC ....... H04W 36/08; H04W 76/27; H04W 4/06; H04W 16/26; H04W 48/20
See application file for complete search history.

(56) References Cited

U.S. PATENT DOCUMENTS

| | | | | |
|---|---|---|---|---|
| 2005/0090278 A1* | 4/2005 | Jeong | ............... | H04W 36/0055 455/525 |
| 2006/0068793 A1* | 3/2006 | Van Lieshout | ..... | H04W 72/005 455/444 |

(Continued)

FOREIGN PATENT DOCUMENTS

| | | |
|---|---|---|
| JP | 2007-502573 A | 2/2007 |
| WO | 2016/163547 A1 | 10/2016 |

*Primary Examiner* — Jael M Ulysse
(74) *Attorney, Agent, or Firm* — Studebaker & Brackett PC

(57) ABSTRACT

A user equipment receives an MBMS service provided using SC-PTM transmission. The user equipment performs a cell reselection operation of selecting a cell to be used as a serving cell of the user equipment while the user equipment is in an RRC idle mode. In the cell reselection operation, the user equipment selects, as the serving cell, a cell having a highest ranking determined based on a radio quality and an offset from among a plurality of cells. In the cell reselection operation, when the user equipment is in an enhanced coverage, the user equipment uses an infinite offset as the offset to be applied to a cell where the MBMS service is provided by the SC-PTM transmission, in response to a predetermined condition for the SC-PTM transmission being satisfied, when the user equipment goes out of the enhanced coverage, stop using the infinite offset.

6 Claims, 18 Drawing Sheets

(56) References Cited

U.S. PATENT DOCUMENTS

| | | | | |
|---|---|---|---|---|
| 2008/0267109 A1* | 10/2008 | Wang | ............... | H04W 72/005 |
| | | | | 370/312 |
| 2010/0254352 A1* | 10/2010 | Wang | ............... | H04W 72/005 |
| | | | | 370/332 |
| 2012/0195221 A1* | 8/2012 | Wang | ............... | H04W 72/005 |
| | | | | 370/252 |
| 2013/0077553 A1* | 3/2013 | Nielsen | ............. | H04W 48/20 |
| | | | | 370/312 |
| 2013/0301509 A1* | 11/2013 | Purnadi | ............ | H04L 65/4076 |
| | | | | 370/312 |
| 2014/0200001 A1* | 7/2014 | Song | ................ | H04W 8/02 |
| | | | | 455/436 |
| 2015/0009958 A1* | 1/2015 | Chang | ............. | H04L 12/189 |
| | | | | 370/331 |
| 2015/0195685 A1* | 7/2015 | Nielsen | ............. | H04W 48/20 |
| | | | | 370/312 |
| 2017/0245121 A1* | 8/2017 | Jung | ................. | H04W 24/10 |
| 2018/0035340 A1 | 2/2018 | Fujishiro et al. | | |

\* cited by examiner

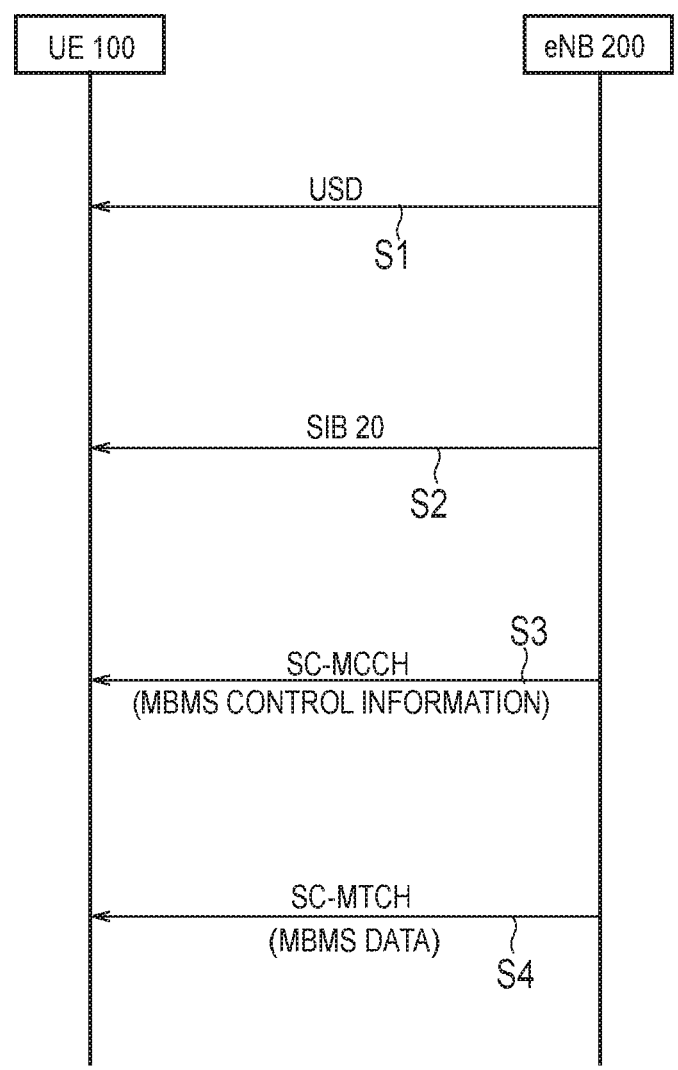

FIG. 9

```
SystemInformationBlockType20 information element

-- ASN1START

SystemInformationBlockType20-r13 ::=    SEQUENCE {
    sc-mcch-RepetitionPeriod-r13        ENUMERATED {rf2, rf4, rf8, rf16, rf32, rf64, rf128, rf256},
    sc-mcch-Offset-r13                  INTEGER (0..10),
    sc-mcch-FirstSubframe-r13           INTEGER (0..9),
    sc-mcch-duration-r13                INTEGER (2..9) OPTIONAL,
    sc-mcch-ModificationPeriod-r13      ENUMERATED {rf2, rf4, rf8, rf16, rf32, rf64, rf128, rf256,
                                            rf512, rf1024, rf2048, rf4096, rf8192, rf16384, rf32768,
                                            rf65536},
    lateNonCriticalExtension            OCTET STRING                OPTIONAL,
    ...
}

-- ASN1STOP
```

FIG. 10

```
                        SCPTMConfiguration message
-- ASN1START

SCPTMConfiguration-r13 ::=       SEQUENCE {
    sc-mtch-InfoList-r13             SC-MTCH-InfoList-r13,
    scptm-NeighbourCellList-r13      SCPTM-NeighbourCellList-r13    OPTIONAL,    -- Need OP
    lateNonCriticalExtension         OCTET STRING                   OPTIONAL,
    nonCriticalExtension             SEQUENCE {}                    OPTIONAL
}

-- ASN1STOP
```

```
                      SC-MTCH-InfoList information element
-- ASN1START

SC-MTCH-InfoList-r13 ::=         SEQUENCE (SIZE (0..maxSC-MTCH-r13)) OF SC-MTCH-Info-r13

SC-MTCH-Info-r13 ::=             SEQUENCE    {
    mbmsSessionInfo-r13              MBMSSessionInfo-r13,
    g-RNTI-r13                       BIT STRING(SIZE(16)),
    sc-mtch-schedulingInfo-r13       SC-MTCH-SchedulingInfo-r13          OPTIONAL,    --
Need OP
    sc-mtch-neighbourCell-r13        BIT STRING (SIZE(maxNeighCell-SCPTM-r13))
    OPTIONAL,     -- Need OP
    ...
}

MBMSSessionInfo-r13 ::=          SEQUENCE    {
    tmgi-r13                         TMGI-r9,
    sessionId-r13                    OCTET STRING (SIZE (1))     OPTIONAL     -- Need OR
}

SC-MTCH-SchedulingInfo-r13::=    SEQUENCE    {
    onDurationTimerSCPTM-r13         ENUMERATED {
                                         psf1, psf2, psf3, psf4, psf5, psf6,
                                         psf8, psf10, psf20, psf30, psf40,
                                         psf50, psf60, psf80, psf100,
                                         psf200},
    drx-InactivityTimerSCPTM-r13     ENUMERATED {
                                         psf0, psf1, psf2, psf4, psf8,
                                         psf10, psf20, psf40,
                                         psf80, psf160, ps320,
                                         psf640, psf960,
                                         psf1280, psf1920, psf2560},
    schedulingPeriodStartOffsetSCPTM-r13   CHOICE {
        sf10                             INTEGER(0..9),
        sf20                             INTEGER(0..19),
        sf32                             INTEGER(0..31),
        sf40                             INTEGER(0..39),
        sf64                             INTEGER(0..63),
        sf80                             INTEGER(0..79),
        sf128                            INTEGER(0..127),
        sf160                            INTEGER(0..159),
        sf256                            INTEGER(0..255),
        sf320                            INTEGER(0..319),
        sf512                            INTEGER(0..511),
        sf640                            INTEGER(0..639),
        sf1024                           INTEGER(0..1023),
        sf2048                           INTEGER(0..2048),
        sf4096                           INTEGER(0..4096),
        sf8192                           INTEGER(0..8192)
    },
    ...
}

-- ASN1STOP
```

```
-- ASN1START

SCPTM-NeighbourCellList-r13 ::=  SEQUENCE (SIZE (1..maxNeighCell-SCPTM-r13)) OF PCI-ARFCN-r13

PCI-ARFCN-r13 ::=                SEQUENCE {
    physCellId-r13                   PhysCellId,
    carrierFreq-r13                  ARFCN-ValueEUTRA-r9     OPTIONAL
}

-- ASN1STOP
```

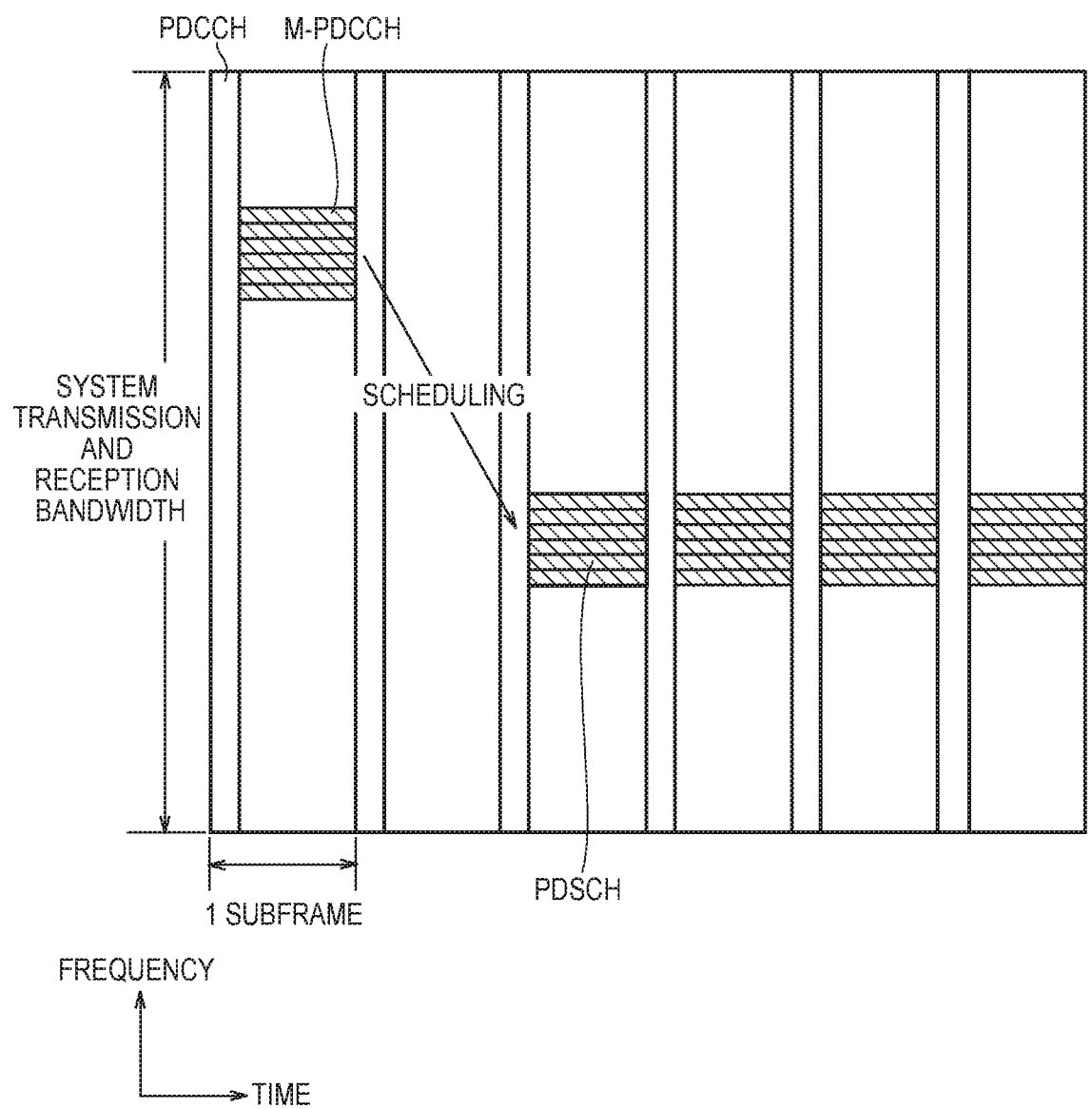

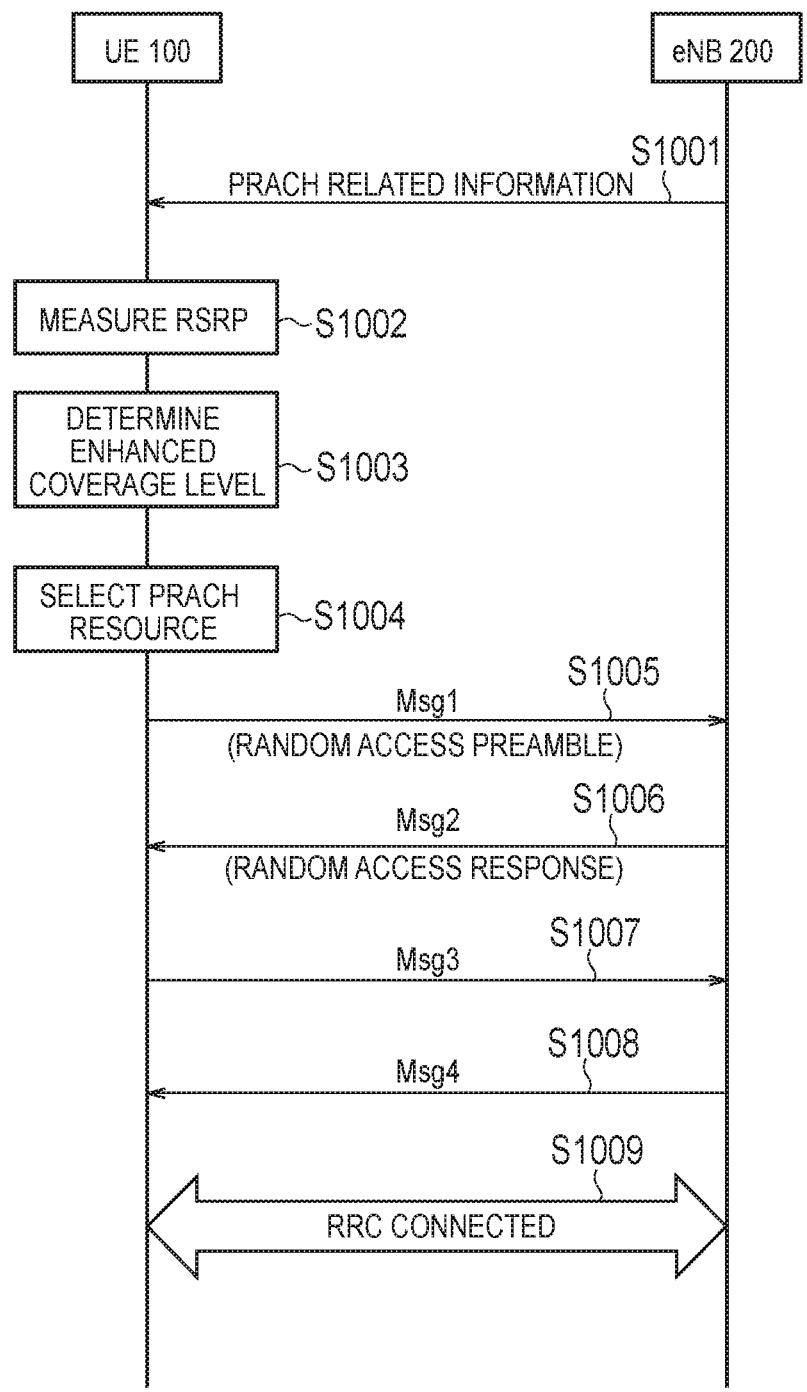

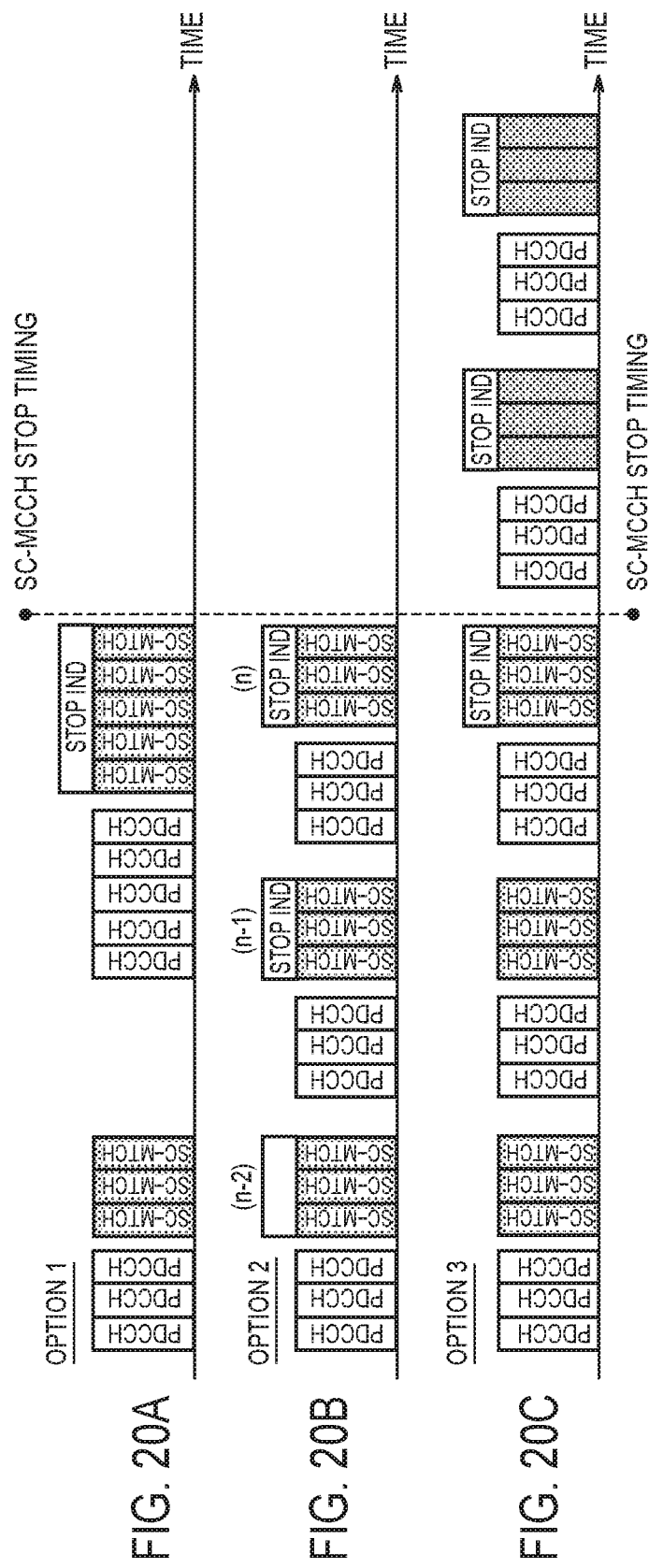

RADIO TERMINAL, PROCESSOR, AND METHOD FOR PERFORMING CELL RESELECTION

RELATED APPLICATION

This application is a continuation application of international application PCT/JP2018/003615, filed Feb. 2, 2018, which claims the benefit of U.S. Provisional Application No. 62/454,185 (filed on Feb. 3, 2017), the entire contents of which are incorporated herein by reference.

TECHNICAL FIELD

The present disclosure relates to a radio terminal and a base station for a mobile communication system.

BACKGROUND

In 3GPP (Third Generation Partnership Project), which is a project aiming to standardize a mobile communication system, the specifications of MBMS (Multimedia Broadcast Multicast Service) transmission have been laid out to provide a radio terminal with a multicast/broadcast service. MBMS transmission schemes have two transmission schemes: MBSFN (Multicast Broadcast Single Frequency Network) and SC-PTM (Single Cell Point-To-Multipoint).

Meanwhile, radio terminals meant for MTC (Machine Type Communication) and IoT (Internet of Things) services, in which communication is performed without human intervention, have been studied. Such a radio terminal is required to achieve low cost, wide coverage area, and low power consumption. For this reason, in 3GPP, a new category of radio terminals having a transmission and reception bandwidth limited only to a part of the system transmission and reception band has been specified. To such a new category of radio terminals, an enhanced coverage function including repetition and the like is applied.

SUMMARY

A user equipment according to an embodiment receives an MBMS service provided using SC-PTM transmission. The user equipment comprises a processor and a memory coupled to the processor. The processor is configured to perform a cell reselection operation of selecting a cell to be used as a serving cell of the user equipment while the user equipment is in an RRC idle mode. The processor is configured to: in the cell reselection operation, select, as the serving cell, a cell having a highest ranking determined based on a radio quality and an offset from among a plurality of cells. The processor is configured to, in the cell reselection operation, when the user equipment is in an enhanced coverage, use an infinite offset as the offset to be applied to a cell where the MBMS service is provided by the SC-PTM transmission, in response to a predetermined condition for the SC-PTM transmission being satisfied. The processor is configured to, in the cell reselection operation, when the user equipment goes out of the enhanced coverage, stop using the infinite offset.

An apparatus according to an embodiment is provided in a user equipment for receiving an MBMS service provided using SC-PTM transmission. The apparatus comprises a processor and a memory coupled to the processor. The processor is configured to perform a cell reselection operation of selecting a cell to be used as a serving cell of the user equipment while the user equipment is in an RRC idle mode. The processor is configured to: in the cell reselection operation, select, as the serving cell, a cell having a highest ranking determined based on a radio quality and an offset from among a plurality of cells. The processor is configured to, in the cell reselection operation, when the user equipment is in an enhanced coverage, use an infinite offset as the offset to be applied to a cell where the MBMS service is provided by the SC-PTM transmission, in response to a predetermined condition for the SC-PTM transmission being satisfied. The processor is configured to, in the cell reselection operation, when the user equipment goes out of the enhanced coverage, stop using the infinite offset.

A method according to an embodiment is a method for use in a user equipment for receiving an MBMS service provided using SC-PTM transmission. The method comprises performing a cell reselection operation of selecting a cell to be used as a serving cell of the user equipment while the user equipment is in an RRC idle mode; in the cell reselection operation, selecting, as the serving cell, a cell having a highest ranking determined based on a radio quality and an offset from among a plurality of cells; in the cell reselection operation, when the user equipment is in an enhanced coverage, using an infinite offset as the offset to be applied to a cell where the MBMS service is provided by the SC-PTM transmission, in response to a predetermined condition for the SC-PTM transmission being satisfied; and in the cell reselection operation, when the user equipment goes out of the enhanced coverage, stopping using the infinite offset.

BRIEF DESCRIPTION OF THE DRAWINGS

FIG. 8 is a flowchart illustrating an operation example of SC-PTM according to the embodiment.

FIG. 9 is a diagram illustrating an SIB 20 according to the embodiment.

FIG. 10 is a diagram illustrating MBMS control information in SC-MCCH according to the embodiment.

FIG. 11 is a diagram illustrating a downlink physical channel for an eMTC UE according to the embodiment.

FIG. 12 is a flowchart illustrating a random access procedure for an eMTC UE and an NB-IoT UE according to the embodiment.

FIG. 20A, FIG. 20B, and FIG. 20C are diagrams each illustrating an example of an operation according to the third embodiment.

DESCRIPTION OF THE EMBODIMENT (Mobile Communication System)

Figure 1:
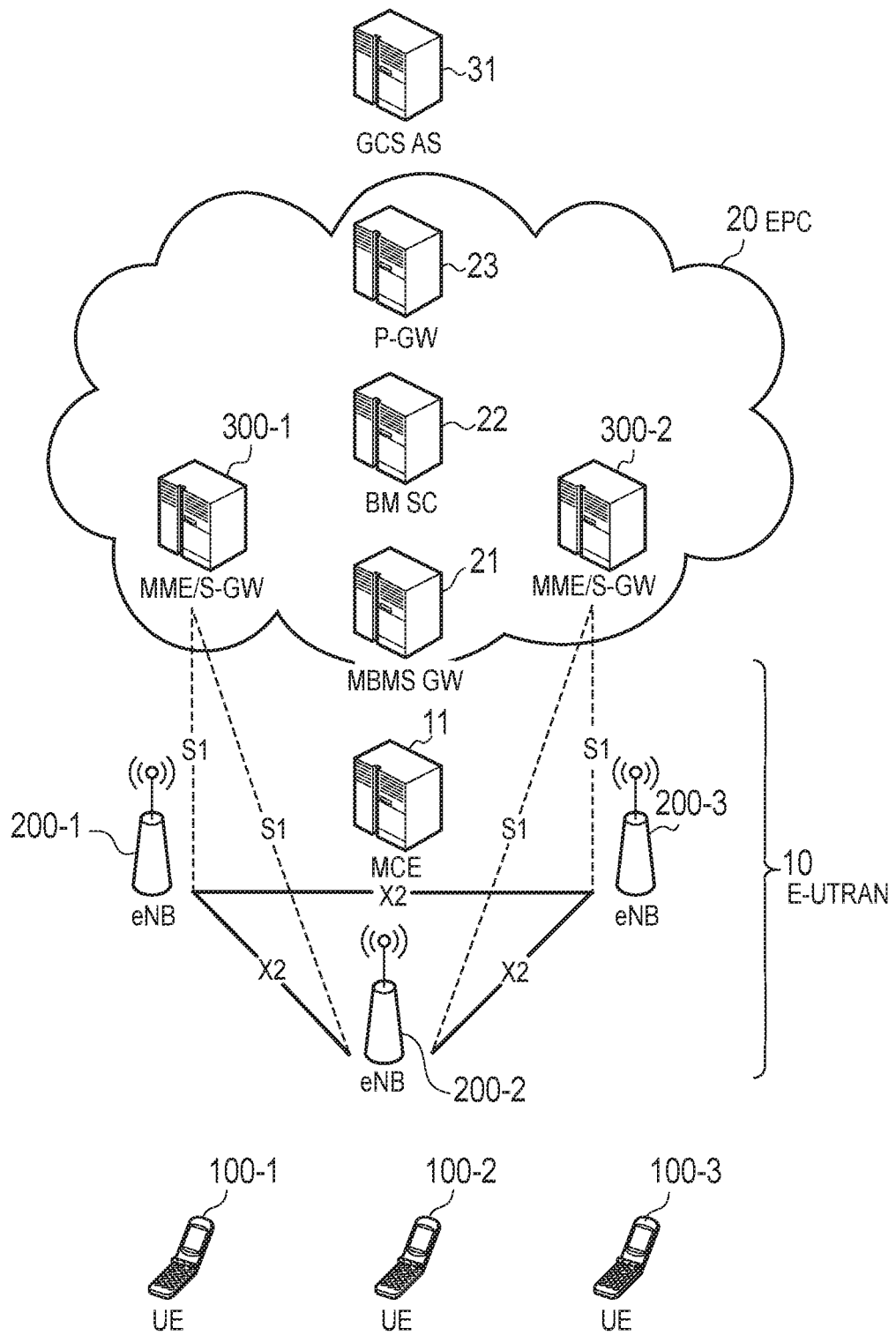
FIG. 1 is a diagram illustrating a configuration of an LTE system (mobile communication system) according to an embodiment.
Figure 2:
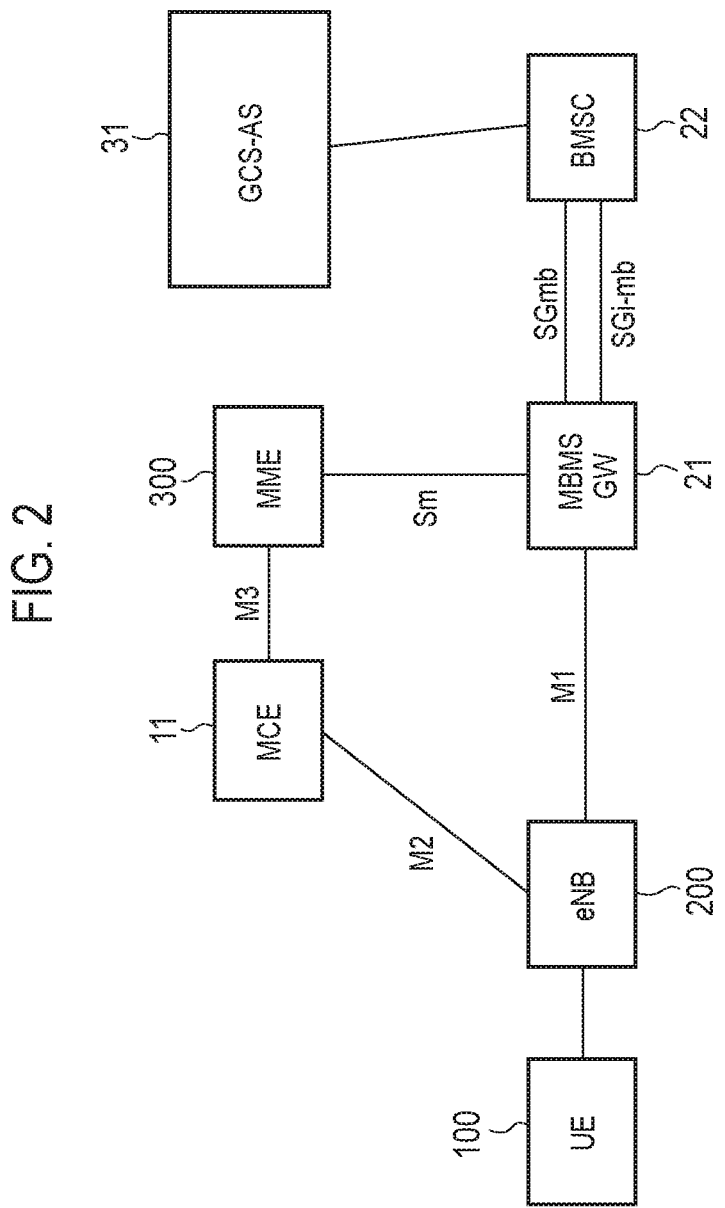
FIG. 2 is a diagram illustrating a network configuration for MBMS according to the embodiment.

The configuration of the mobile communication system according to the embodiment will be described. The mobile communication system according to the embodiment is an LTE (Long Term Evolution) system whose specifications are defined in 3GPP. FIG. 1 is a diagram illustrating a configuration of the LTE system according to the embodiment. FIG. 2 is a diagram illustrating a network configuration for MBMS.

As illustrated in FIG. 1, the LTE system includes a radio terminal (UE: User Equipment) 100, a radio access network (E-UTRAN: Evolved-UMTS Terrestrial Radio Access Network) 10, and a core network (Evolved Packet Core) 20. The E-UTRAN 10 and the EPC 20 configure a network of the LTE system.

The UE 100 is a mobile communication device. The UE 100 performs radio communication with the eNB 200 that manages the cell (serving cell) in which the UE 100 exists.

The E-UTRAN 10 includes base stations (evolved Node-Bs) 200. The eNBs 200 are connected to each other via an X2 interface. The eNB 200 manages one or a plurality of cells and performs radio communication with the UE 100 that has established connection with a cell of the eNB 200. The eNB 200 has a radio resource management (RRM) function, a routing function of user data (hereinafter referred to simply as "data"), a measurement control function for mobility control/scheduling, and the like. "Cell" is used as a term indicating the smallest unit of radio communication area. "Cell" is also used as a term indicating a function or resource for performing radio communication with the UE 100.

The EPC 20 includes a mobility management entity (MME) and a serving gateway (S-GW) 300. The MME performs various mobility control and the like for the UE 100. The S-GW performs data transfer control. The MME/S-GW 300 is connected to the eNB 200 via an S1 interface.

Network entity for MBMS will be described. The E-UTRAN 10 includes an MCE (Multi-Cell/Multicast Coordinating Entity) 11. The MCE 11 is connected to the eNB 200 via an M2 interface. The MCE is connected to the MME 300 via an M3 interface (see FIG. 2). The MCE 11 performs MBSFN radio resource management/allocation and the like. Specifically, the MCE 11 performs scheduling of MBSFN transmission. On the other hand, the scheduling of the SC-PTM transmission is performed by the eNB 200.

The EPC 20 includes an MBMS GW (MBMS Gateway) 21. The MBMS GW 21 is connected to the eNB 200 via an M1 interface. The MBMS GW 21 is connected to the MME 300 via an Sm interface. The MBMS GW 21 is connected to the BM-SC 22 via an SG-mb and SGi-mb interfaces (see FIG. 2). The MBMS GW 21 performs IP multicast data transmission, session control and the like to the eNB 200.

The EPC 20 includes a BM-SC (Broadcast Multicast Service Center) 22. The BM-SC 22 is connected to the MBMS GW 21 via the SG-mb and SGi-mb interfaces. The BM-SC 22 is connected to the P-GW 23 via an SGi interface (see FIG. 2). The BM-SC 22 manages and allocates TMGI (Temporary Mobile Group Identity) and the like.

Further, a GCS AS (Group Communication Service Application Server) 31 is provided in a network (that is, the Internet) outside the EPC 20. The GCS AS 31 is an application server for group communication. The GCS AS 31 is connected to the BM-SC 22 via an MB2-U interface and an MB 2-C interface. The GCS AS 31 is connected to the P-GW 23 via the SGi interface. The GCS AS 31 performs management of groups and data distribution etc. in group communication.

Figure 3:
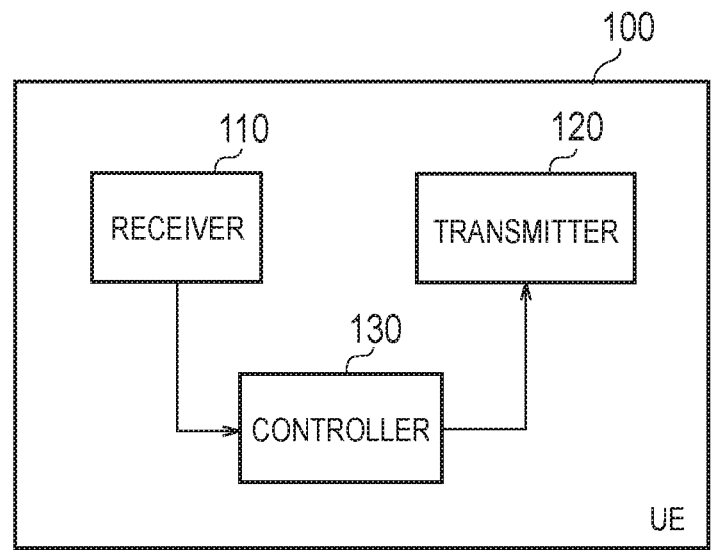
FIG. 3 is a diagram illustrating a configuration of a UE (radio terminal) according to the embodiment.

FIG. 3 is a diagram illustrating the configuration of the UE 100 (radio terminal) according to the embodiment. As illustrated in FIG. 3, the UE 100 includes a receiver 110, a transmitter 120, and a controller 130.

The receiver 110 performs various types of reception under the control of the controller 130. The receiver 110 includes antennas and a receiving machine. The receiving machine converts the radio signal received by the antennas into a baseband signal (reception signal) and outputs the baseband signal to the controller 130.

The transmitter 120 performs various transmissions under the control of the controller 130. The transmitter 120 includes antennas and a transmitting machine. The transmitting machine converts a baseband signal (transmission signal) output from the controller 130 into a radio signal and transmits the radio signal from the antennas.

The controller 130 performs various controls in the UE 100. The controller 130 includes a processor and a memory. The memory stores programs executed by the processor and information used for processing by the processor. The processor includes a baseband processor that performs modulation and demodulation, encoding, decoding, and the like of the baseband signal and a CPU (Central Processing Unit) that performs various processes by executing programs stored in the memory. The processor may include a codec that performs encoding/decoding audio/video signals. The processor executes various processes to be described later.

Figure 4:
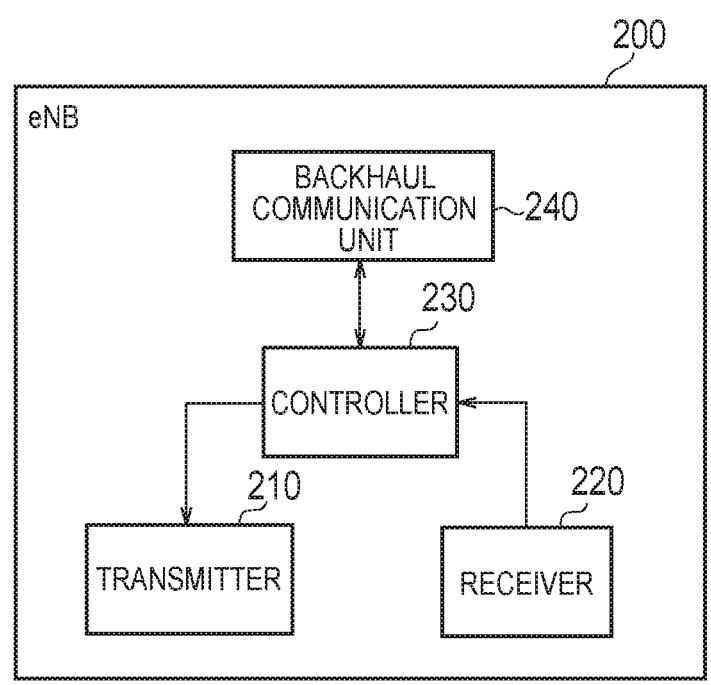
FIG. 4 is a diagram illustrating a configuration of an eNB (base station) according to the embodiment.

FIG. 4 is a diagram illustrating a configuration of an eNB (base station) according to the embodiment. As illustrated in FIG. 4, the eNB 200 includes a transmitter 210, a receiver 220, a controller 230, and a backhaul communication unit 240.

The transmitter 210 performs various transmissions under the control of the controller 230. The transmitting unit 210 includes antennas and a transmitting machine. The transmitting machine converts a baseband signal (transmission signal) outputted by the controller 230 into a radio signal and transmits the radio signal from the antennas.

The receiver 220 performs various types of reception under the control of the controller 230. The receiver 220 includes antennas and a receiving machine. The receiving machine converts the radio signal received by the antennas into a baseband signal (received signal) and outputs the baseband signal to the controller 230.

The controller 230 performs various controls in the eNB 200. The controller 230 includes a processor and a memory. The memory stores programs executed by the processor and information used for processing by the processor. The processor includes a baseband processor that performs modulation and demodulation, encoding, decoding, and the like of the baseband signal and a CPU that performs various processes by executing programs stored in the memory. The processor executes various processes to be described later.

The backhaul communication unit 240 is connected to the adjacent eNB via the X2 interface. The backhaul communication unit 240 is connected to the MME/S-GW 300 via the S1 interface. The backhaul communication unit 240 is used for communication performed on the X2 interface, communication performed on the S1 interface, and the like. The backhaul communication unit 240 can also be used for communication on the M1 interface and for communication on the M2 interface.

Figure 5:
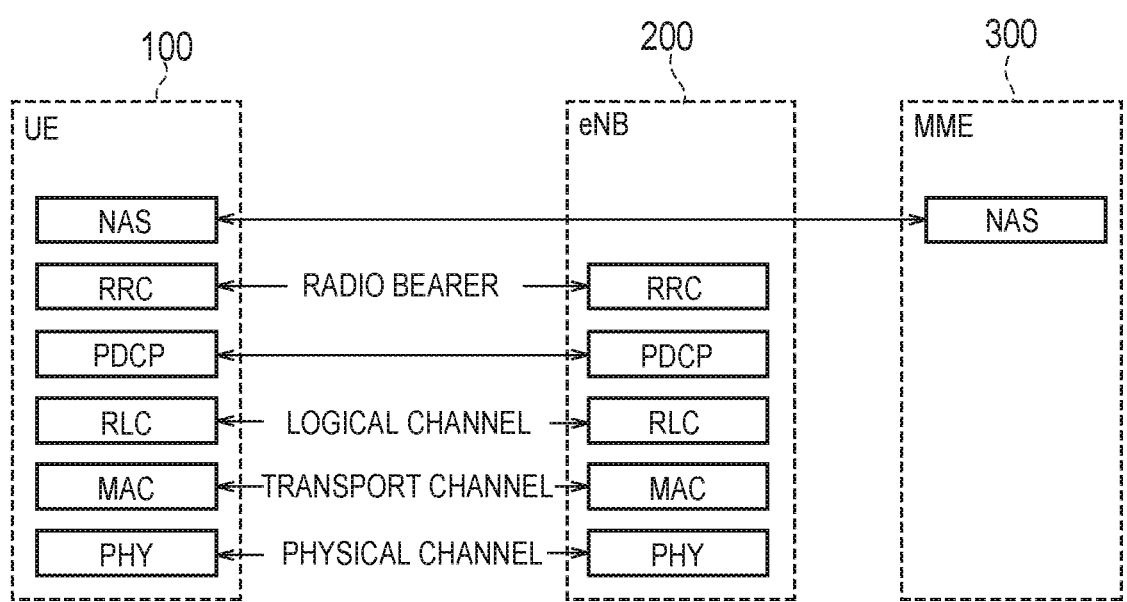
FIG. 5 is a diagram illustrating a protocol stack of a radio interface in the LTE system according to the embodiment.

FIG. 5 is a diagram illustrating a protocol stack of a radio interface in the LTE system. As illustrated in FIG. 5, the radio interface protocol is divided into the first layer to the third layer of the OSI reference model. The first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control) layer.

The physical layer performs coding/decoding, modulation/demodulation, antenna mapping/demapping, and resource mapping/demapping. Between the physical layer of the UE 100 and the physical layer of the eNB 200, data and control signals are transmitted via the physical channel.

The MAC layer performs priority control of data, retransmission processing by HARQ (Hybrid ARQ), and the like. Between the MAC layer of the UE 100 and the MAC layer of the eNB 200, data and control signals are transmitted via the transport channel. The MAC layer of the eNB 200 includes a scheduler. The scheduler determines the uplink and downlink transport format (Transport Block Size, Modulation and Coding Scheme (MCS)) and the allocated resource block to the UE 100.

The RLC layer uses the functions of the MAC layer and the physical layer to transmit data to the RLC layer on the receiving side. Between the RLC layer of the UE 100 and the RLC layer of the eNB 200, data and control signals are transmitted via logical channels.

The PDCP layer carries out header compression/decompression, encryption/decryption.

The RRC layer is defined only in the control plane handling the control signal. Messages (RRC messages) for various configurations are transmitted between the RRC layer of the UE 100 and the RRC layer of the eNB 200. The RRC layer controls logical channels, transport channels, and physical channels in response to establishment, reestablishment and release of radio bearers. If there is a connection (RRC connection) between the RRC of the UE 100 and the RRC of the eNB 200, the UE 100 is in an RRC connected mode. If there is not a connection (RRC connection) between the RRC of the UE 100 and the RRC of the eNB 200, the UE 100 is in an RRC idle state.

The NAS (Non-Access Stratum) layer located above the RRC layer performs session management, mobility management, and the like.

Figure 6A:
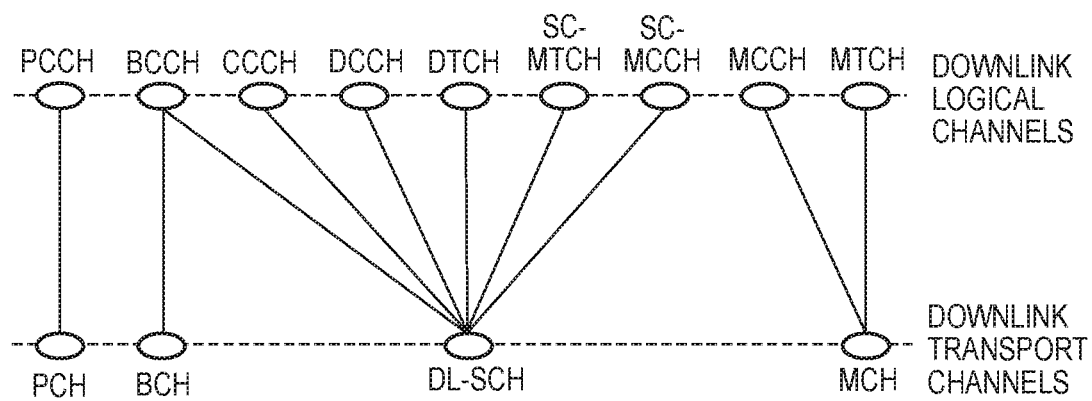
FIG. 6A and FIG. 6B are diagrams each illustrating a channel configuration of a downlink of the LTE system according to the embodiment.
Figure 6B:
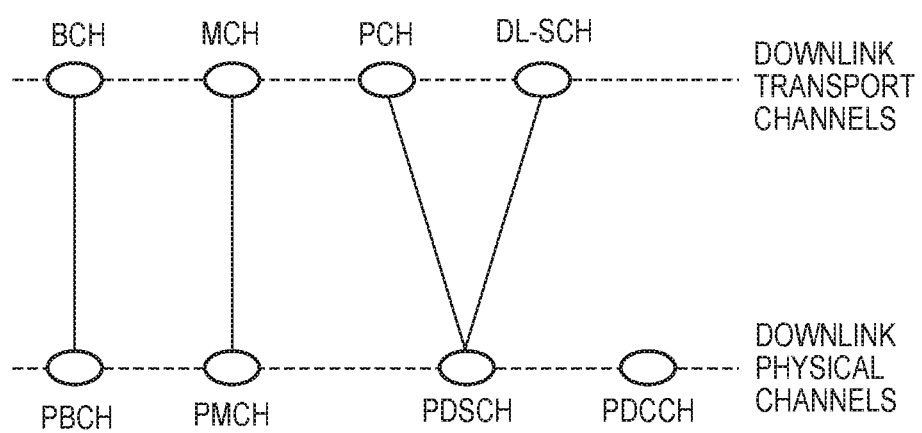

FIG. 6 is a diagram illustrating a channel configuration of downlink of the LTE system. FIG. 6(*a*) illustrates mapping between a logical channel (Downlink Logical Channel) and a transport channel (Downlink Transport Channel).

As illustrated in FIG. 6(*a*), PCCH (Paging Control Channel) is a logical channel for notifying paging information and system information change. The PCCH is mapped to PCH (Paging Channel) that is a transport channel.

BCCH (Broadcast Control Channel) is a logical channel for system information. The BCCH is mapped to BCH (Broadcast Control Channel) and a DL-SCH (Downlink Shared Channel), both of which are transport channels.

CCCH (Common Control Channel) is a logical channel for transmission control information between the UE 100 and the eNB 200. The CCCH is used if the UE 100 does not have an RRC connection with the network. The CCCH is mapped to the DL-SCH.

DCCH (Dedicated Control Channel) is a logical channel for transmitting individual control information between the UE 100 and the network. The DCCH is used if the UE 100 has an RRC connection. The DCCH is mapped to the DL-SCH.

DTCH (Dedicated Traffic Channel) is an individual logical channel for data transmission. The DTCH is mapped to the DL-SCH.

SC-MTCH (Single Cell Multicast Traffic Channel) is a logical channel for SC-PTM transmission. The SC-MTCH is a point-to-multipoint downlink channel for multicast transmitting data (MBMS) from the network to the UE 100 by using the SC-PTM transmission.

SC-MCCH (Single Cell Multicast Control Channel) is a logical channel for SC-PTM transmission. The SC-MCCH is a point-to-multipoint downlink channel for multicast transmitting MBMS control information for one or more SC-MTCHs from the network to the UE 100. The SC-MCCH is used for a UE 100 that is to receive an MBMS using SC-PTM transmission or that is interested in the reception. Further, there is only one SC-MCCH in one cell.

MCCH (Multicast Control Channel) is a logical channel for MBSFN transmission. The MCCH is used for transmitting MBMS control information for MTCH from the network to the UE 100. The MCCH is mapped to an MCH (Multicast Channel) that is a transport channel.

MTCH (Multicast Traffic Channel) is a logical channel for MBSFN transmission. The MTCH is mapped to the MCH.

FIG. 6(*b*) illustrates mapping between a transport channel (Downlink Transport Channel) and a physical channel (Downlink Physical Channel).

As illustrated in FIG. 6(*b*), the BCH is mapped to PBCH (Physical Broadcast Channel).

The MCH is mapped to PMCH (Physical Multicast Channel). The MCH supports MBSFN transmission by a plurality of cells.

The PCH and the DL-SCH are mapped to PDSCH (Physical Downlink Shared Channel). The DL-SCH supports HARQ, link adaptation, and dynamic resource allocation.

PDCCH carries resource allocation information of the PDSCH (DL-SCH, PCH), HARQ information on the DL-SCH, and the like. Further, the PDCCH carries an uplink scheduling grant.

Figure 7:
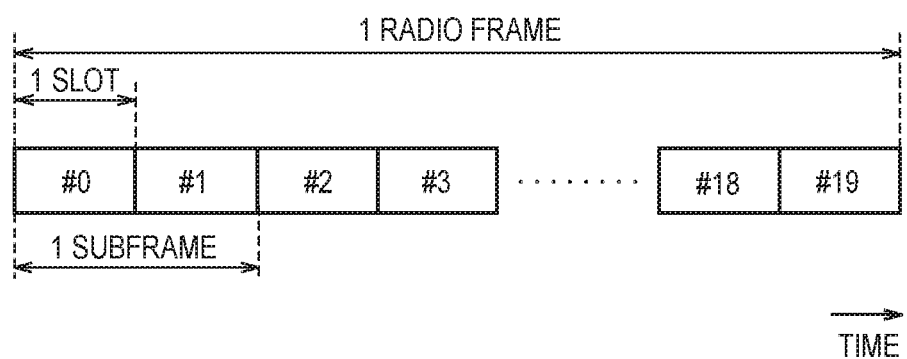
FIG. 7 is a diagram illustrating a configuration of a radio frame of the LTE system according to the embodiment.

FIG. 7 is a diagram illustrating a configuration of a radio frame of the LTE system. In the LTE system, OFDMA (Orthogonal Frequency Division Multiple Access) is applied to a downlink. In the LTE system, SC-FDMA (Single Carrier Frequency Division Multiple Access) is applied to an uplink.

As illustrated in FIG. 7, the radio frame includes ten subframes arranged in a time direction. Each of the subframes includes two slots arranged in the time direction. Each of the subframes has a length of 1 ms and each of the slots has a length of 0.5 ms. Each of the subframes includes a plurality of resource blocks (RBs) in a frequency direction, and a plurality of symbols in the time direction. Each of the resource blocks includes a plurality of subcarriers in the frequency direction. One resource element (RE) includes one symbol and one subcarrier. Further, of radio resources (time and frequency resources) to be allocated to a UE 100, the frequency resource can be identified by a resource block, and the time resource can be identified by a subframe (or a slot).

In the downlink, a section including several symbols at the head of each of the subframes is a region used as the PDCCH for mainly transmitting a downlink control signal. Furthermore, the remaining portion of each of the subframes is a region available as the PDSCH for mainly transmitting downlink data. Further, in the downlink, an MBSFN subframe that is a subframe for MBSFN may be set.

In the uplink, both ends in the frequency direction of each subframe are regions used as the PUCCH for mainly transmitting a uplink control signal. The remaining portion of each subframe is a region available as the PUSCH for mainly transmitting uplink data.

[Outline of Cell Reselection Operation]

Next, outline of cell reselection operation will be described. The UE 100 under RRC idle mode measures, if a start condition is satisfied, the quality of an adjacent cell adjacent to the current serving cell, and selects, from among the cells that satisfy a selection condition, the target cell used as a serving cell.

Firstly, the start condition is shown as follows:

(A1) A frequency having a higher priority than the priority of the frequency of the current serving cell the UE 100 always measures the quality of the frequency having the higher priority.

(A2) A frequency having a priority equal to or lower than the priority of the frequency of the current serving cell the UE 100 measures, if the quality of the current serving cell falls below a predetermined threshold value, the quality of the frequency having the equal priority or the lower priority.

Secondly, the selection condition is shown as follows:

(B1) The priority of the frequency of the adjacent cell is higher than the priority of the current serving cell the UE 100 selects a cell that satisfies a relationship of Squal>ThreshX, HighQ over a predetermined period (TreselectionRAT), or a cell that satisfies a relationship of Srxlev>ThreshX, HighP over the predetermined period (TreselectionRAT). In such a case, such criteria to be satisfied by the adjacent cell may be referred to as "S-criteria".

It is noted that Squal represents a cell selection quality level. Squal is calculated by Squal=Qqualmeas−(Qqualmin+Qqualminoffset)−Qoffsettemp. Qqualmeas is a quality level (RSRQ) of the adjacent cell, Qqualmin is a minimum required quality level, Qqualminoffset is a predetermined offset regularly applied to the adjacent cell, and Qoffsettemp is an offset temporarily applied to the adjacent cell. ThreshX, HighQ is a predetermined threshold value.

Further, Srxlev represents a cell selection reception level. Srxlev is calculated by Srxlev=Qrxlevmeas−(Qrxlevmin+Qrxlevminoffset)−Pcompensation−Qoffsettemp. Qrxlevmeas is a reception level (RSRP) of the adjacent cell, Qrxlevmin is a minimum required reception level, Qrxlevminoffset is a predetermined offset regularly applied to the adjacent cell, Pcompensation is a parameter related to an uplink capability, and Qoffsettemp is an offset temporarily applied to the adjacent cell. ThreshX, HighP is a predetermined threshold value.

(B2) The priority of the frequency of the adjacent cell is the same as the priority of the current serving cell:

the UE 100 calculates a ranking Rs of the current serving cell and a ranking Rn of the adjacent cell. The UE 100 selects a cell having a higher ranking Rn than Rs over a predetermined period (TreselectionRAT) as the target cell.

In such a case, such criteria to be satisfied by the adjacent cell maybe referred to as "R-criteria".

It is noted that Rs is calculated by Rs=Qmeas,s+QHyst−Qoffsettemp. Rn is calculated by Rn=Qmeas,n−Qoffsettemp. Qmeas,s is the reception level (RSRP) of the current serving cell, and Qmeas,n is the reception level (RSRP) of the adjacent cell. QHyst is a hysteresis value for achieving preferential reselection of the current serving cell as the target cell. Qoffsettemp is an offset temporarily applied to the current serving cell and the adjacent cell.

(B3) The priority of the frequency of the adjacent cell is lower than the priority of the current serving cell the UE 100 selects, under a premise that Squal<ThreshServing, LowQ is satisfied over a predetermined period (TreselectionRAT), or Srxlev<ThreshServing, LowP is satisfied over the predetermined period (TreselectionRAT), the target cell from among the adjacent cells by a method similar to the above described (B1).

It is noted that ThreshServing, LowQ and ThreshServing, LowP are predetermined threshold values similarly to ThreshX, HighQ and ThreshX, HighP.

It is noted that various types of parameters used for selecting the target cell are included in system information (SIB; System Information Block) broadcast from the eNB 200. The various types of parameters include the priority of the frequency (cellReselectionPriority), a predetermined period (TreselectionRAT), various types of offsets (Qqualminoffset, Qrxlevminoffset, Qoffsettemp, QHyst, Qoffset), and various types of threshold values (ThreshX, HighQ, ThreshX, HighP, ThreshServing, LowQ, ThreshServing, LowP).

(Outline of SC-PTM Transmission)

Next, outline of SC-PTM transmission will be described. Radio transmission schemes for MBMS include two schemes: MBSFN transmission and SC-PTM transmission. In the MBSFN transmission, data is transmitted via the PMCH for each MBSFN area including a plurality of cells. In contrast, in the SC-PTM transmission, data is transmitted via the PDSCH for each cell. In the following, a scenario in which the UE 100 performs SC-PTM reception is mainly assumed. However, MBSFN transmission may be assumed.

The UE 100 may receive the MBMS service in the RRC connected state. The UE 100 may receive the MBMS service in the RRC idle state. In the following, it is mainly assumed that the UE 100 receives the MBMS service in the RRC idle state.

FIG. 8 is a diagram illustrating an operation example of SC-PTM transmission.

In step S1, the UE 100 acquires a USD (User Service Description) from the EPC 20 via the eNB 200. The USD provides basic information on each MBMS service. For each MBMS service, the USD includes a TMGI for identifying the MBMS service, a frequency at which the MBMS service is provided, and a provision start/end time of the MBMS service.

In step S2, the UE 100 receives a SIB 20 from the eNB 200 via the BCCH. The SIB 20 includes information (scheduling information) necessary for acquiring the SC-MCCH. FIG. 9 is a diagram illustrating the SIB 20. As illustrated in FIG. 9, the SIB 20 includes sc-mcch-ModificationPeriod, sc-mcch-RepetitionPeriod, sc-mcch-Offset and sc-mcch-Subframe and the like. The sc-mcch-ModificationPeriod represents a cycle in which the content of the SC-MCCH can be changed. The sc-mcch-RepetitionPeriod represents a transmission (retransmission) time interval of the SC-MCCH in the number of radio frames. The sc-mcch-Offset represents a scheduled radio frame offset of the SC-MCCH. The sc-mcch-Subframe represents a subframe in which the SC-MCCH is scheduled.

In step S3, the UE 100 receives MBMS control information from the eNB 200 via the SC-MCCH, based on the SIB 20. MBMS control information may be also called SCPTM configuration information (SCPTM Configuration). For the SC-MCCH transmission in the physical layer, an SC-RNTI (Single Cell RNTI) is used. FIG. 10 is a diagram illustrating the MBMS control information (SC-PTM configuration information) in the SC-MCCH. The SC-PTM configuration information includes control information applicable to the MBMS service, which is transmitted via SC-MRB (Single Cell MBMS Point to Multipoint Radio Bearer). The SC-PTM configuration information includes sc-mtch-InfoList and scptmNeighbourCellList. The sc-mtch-InfoList contains configuration for each SC-MTCH in the cell transmitting that information. The scptmNeighbourCellList is a list of neighbour cells providing the MBMS service via the SC-MRB. The sc-mtch-InfoList contains one or more pieces of SC-MTCH-Info. Each piece of the SC-MTCH-Info contains information on an ongoing MBMS session (mbmsSession-Info) to be transmitted via the SC-MRB, a G-RNTI (Group RNTI) corresponding to the MBMS session, and sc-mtch-schedulingInfo being DRX information for the SC-MTCH. The mbmsSessionInfo contains a TMGI and a session ID (sessionId) to identify the MBMS service. The G-RNTI is an RNTI to identify a multicast group (specifically, SC-MTCH addressed to a specific group). The G-RNTI is mapped to the TMGI on a one-to-one basis. The sc-mtch-schedulingInfo contains onDurationTimerSCPTM, drx-InactivityTimerSCPTM, and schedulingPeriodStartOffsetSCPTM. The schedulingPeriodStartOffsetSCPTM contains SC-MTCH-SchedulingCycle and SC-MTCH-SchedulingOffset.

In step S4, the UE 100 receives the MBMS service (MBMS data) corresponding to the TMGI, in which the UE 100 itself is interested, via the SC-MTCH, based on SC-MTCH-SchedulingInfo in the SC-PTM configuration information. In the physical layer, the eNB 200, after transmitting the PDCCH by using the G-RNTI, transmits the MBMS data via the PDSCH.

It should be noted that the control signal (signaling) described with reference to FIG. 8 is an example. Due to optimization for power saving reception or the like, part of the control signals may be omitted or the order of the control signals may be changed.

(Overview of eMTC and NB-IoT)

Next, an overview of eMTC and NB-IoT will be described. In the embodiment, a scenario is assumed where a new category of UE 100 exists. The new category of UE 100 is a UE 100 whose transmission and reception bandwidth is limited only to a part of the system transmission and reception band. The new UE category is referred to as, for example, category M1 and NB (Narrow Band)-IoT category. The category M1 is an eMTC (enhanced Machine Type Communications) UE. Further, the NB-IoT UE is category NB1. The category M1 limits the transmission and reception bandwidth of the UE 100 to 1.08 MHz (that is, a bandwidth of six resource blocks). The category M1 supports an enhanced coverage (EC) function using repetition and the like. The NB-IoT category further limits the transmission and reception bandwidth of the UE 100 to 180 kHz (that is, a bandwidth of one resource block). The NB-IoT category supports the enhanced coverage function. The repetition is a technique of using a plurality of subframes to repeatedly transmit the same signal. As an example, the system bandwidth of the LTE system is 10 MHz, of which the transmission and reception bandwidth is 9 MHz (that is, the bandwidth of 50 resource blocks). On the other hand, the category M1 of UE 100 cannot receive a normal PDCCH because the category M1 of UE 100 cannot receive a downlink radio signal transmitted with a wider bandwidth than six resource blocks. For this reason, MPDCCH (MTC-PDCCH) which is PDCCH for the MTC is introduced. For the same reason, NPDCCH (NB-PDCCH) which is PDCCH for the NB-IoT is introduced.

The enhanced coverage function may include repetition for repeatedly transmitting the same signal. As a repetition count increases, the coverage can be enhanced. The enhanced coverage function may include power boosting for increasing a power density of the transmitted signal. As an example, the power density is increased by narrowband transmission for narrowing the frequency bandwidth of the transmitted signal. As the power density of the transmitted signal increases, the coverage can be enhanced. The enhanced coverage function may include a lower MCS transmission for lowering the MCS to be used for the transmitted signal. The coverage can be enhanced by performing the transmission using an MCS with a low data rate and a high error resilience.

FIG. 11 is a diagram illustrating a downlink physical channel for the eMTC UE. As illustrated in FIG. 11, the eNB 200 transmits MPDCCH within six resource blocks. The MPDCCH includes scheduling information for allocating PDSCH. As an example, the MPDCCH allocates PDSCH for a subframe different from the subframe in which the MPDCCH is transmitted. The eNB 200 transmits the PDSCH within six resource blocks. The eNB 200 allocates PDSCHs to a plurality of subframes to perform the repetition of the same signal. The category M1 of UE 100 identifies the allocated PDSCH by receiving the MPDCCH and receives the data transmitted with the allocated PDSCH.

FIG. 12 is a flowchart illustrating a random access procedure for an eMTC UE and an NB-IoT UE. In an initial state of FIG. 12, the UE 100 is in an RRC idle mode. The UE 100 performs a random access procedure to transition to an RRC connected mode.

The UE 100 selects a cell of the eNB 200 as a serving cell. If the first cell selection criteria (first S-criteria) for normal coverage are not satisfied and the second cell selection criteria (second S-criteria) for enhanced coverage are satisfied, the UE 100 may determine that the UE 100 is in the enhanced coverage. A "UE in enhanced coverage" means a UE that is required to use an enhanced coverage function (enhanced coverage mode) to access a cell. It is noted that it is mandatory for the eMTC UE to use the enhanced coverage mode.

In step S1001, the eNB 200 transmits PRACH (Physical Random Access Channel) related information by broadcast signaling (for example, an SIB). The PRACH related information includes various types of parameters provided for each enhanced coverage level. As an example, a total of four levels of enhanced coverage levels 0 to 3 are defined for the enhanced coverage levels. The various types of parameters include an RSRP (Reference Signal Received Power) threshold value, a PRACH resource, and the maximum preamble transmission count. The PRACH resource includes a radio resource (time-frequency resource) and a signal sequence (preamble sequence). The UE 100 stores the received PRACH related information.

In step S1002, the UE 100 measures the RSRP, based on a reference signal transmitted from the eNB 200.

In step S1003, the UE 100 compares the measured RSRP with the RSRP threshold for each enhanced coverage level to determine the enhanced coverage level of the UE 100. The enhanced coverage level indicates the degree of the enhanced coverage required for the UE 100. The enhanced coverage level is related at least to the transmission count in repetition (that is, repetition count).

In step S1004, the UE 100 selects a PRACH resource corresponding to the enhanced coverage level of the UE 100.

In step S1005, the UE 100 uses the selected PRACH resource to transmit Msg 1 (random access preamble) to the eNB 200. The eNB 200 identifies the enhanced coverage level of the UE 100, based on the PRACH resource used for the received Msg 1.

In step S1006, the eNB 200 transmits, to the UE 100, Msg 2 (random access response) including scheduling information indicating the PUSCH resource allocated to the UE 100. The UE 100 can transmit the Msg 1 a plurality of times up to the maximum preamble transmission count corresponding to the enhanced coverage level of the UE 100 until the Msg 2 is normally received.

In step S1007, the UE 100 transmits Msg 3 to the eNB 200, based on the scheduling information. The Msg 3 may be an RRC Connection Request message.

In step S1008, the eNB 200 transmits Msg 4 to the UE 100.

In step S1009, the UE 100 transitions to an RRC connected mode in response to reception of the Msg 4. Thereafter, the eNB 200 controls the repetition and the like to the UE 100, based on the identified enhanced coverage level.

First Embodiment

A first embodiment will be described while the mobile communication system as described above is assumed. In the first embodiment, a scenario is assumed in which a batch delivery of firmware or the like is performed by SC-PTM transmission to the new category of the UE 100 described above. Further, a case is mainly assumed where the UE 100 in an RRC idle mode receives an MBMS service provided by SC-PTM transmission.

Figure 13:
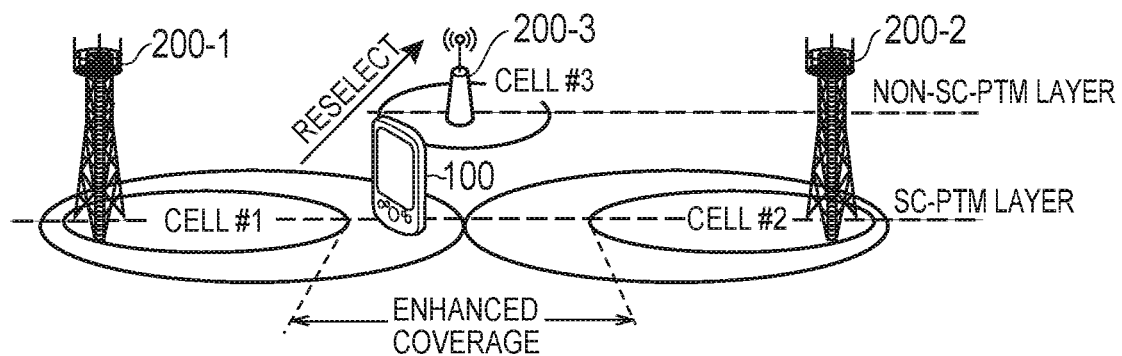
FIG. 13 is a diagram illustrating an operation scenario according to a first embodiment.

FIG. 13 is a diagram illustrating an operation scenario according to the first embodiment.

As illustrated in FIG. 13, in an RRC idle mode, the UE (eMTC UE or NB-IoT UE) 100 is in an enhanced coverage. Specifically, the UE 100 is located in the enhanced coverage of a cell #1 managed by an eNB 200-1, and selects the cell #1 as the serving cell. Each of the cell #1 managed by the eNB 200-1 and a cell #2 managed by an eNB 200-2 is an SC-PTM cell where an MBMS service is provided by using SC-PTM transmission. A cell #3 managed by an eNB 200-3 is a non-SC-PTM cell where no MBMS service is provided by using the SC-PTM transmission.

The UE 100 is receiving or interested in receiving the MBMS service provided by using the SC-PTM transmission. A state where the UE 100 is interested in receiving the MBMS service may be a state where the UE is not yet to receive the MBMS service, but is configured to receive the MBMS service from a higher layer or the like.

The enhanced coverage of the cell #1 and the coverage of the cell #3 geographically overlap. In this case, the UE 100 may determine that a radio quality of the cell #3 is better than a radio quality of the cell #1 and reselect the cell #3 as the serving cell. The radio quality is, for example, a reception level (RSRP). In this case, to ensure that the UE 100 receives the MBMS service, the UE 100 needs to receive the MBMS service by unicast from the network by way of unicast communication (unicast transmission). However, to perform the unicast communication, the UE 100 needs to transition from the RRC idle mode to an RRC connected mode. Therefore, the utilization efficiency of radio resources is degraded, and the power consumption of the UE 100 increases.

The first embodiment is an embodiment aiming to solve such a problem. The UE 100 according to the first embodiment receives the MBMS service provided by using the SC-PTM transmission. The controller 130 of the UE 100 performs a cell reselection operation of selecting a cell to be used as the serving cell of the UE 100 while the UE 100 is in the RRC idle mode. In the cell reselection operation, the controller 130 of the UE 100 selects, as the serving cell, a cell having the highest ranking determined based on the radio quality and the offset from among a plurality of cells. If a predetermined condition for the SC-PTM transmission is satisfied, the controller 130 of the UE 100 configures an infinite offset as an offset to be applied to a predetermined cell. The infinite offset may be a positive infinity (+∞) or a negative infinity (−∞).

The predetermined condition may be that a cell where the MBMS service is provided by the SC-PTM transmission exists in a plurality of cells. The UE 100 may determine whether the MBMS service is provided by the SC-PTM transmission in the serving cell and/or a neighboring cell, based on the SIB 20 and/or SC-MCCH (for example, scptmNeighborCellList) received from the serving cell. The predetermined condition may be that the UE 100 is receiving or interested in receiving the MBMS service.

The predetermined cell to which the infinite offset is applied may be a cell (SC-PTM cell) where the MBMS service is provided by the SC-PTM transmission. In this case, the infinite offset may be an offset for increasing the ranking of the predetermined cell to the highest. As an example, a case is assumed where a current serving cell is an SC-PTM cell and the UE 100 calculates a ranking Rs of the current serving cell with the above-mentioned calculation formula (that is, "$R_s = Q_{meas's} + Q_{Hyst} - Qoffset_{temp}$"). In such a case, a value of the negative infinity is set to $Qoffset_{temp}$ to be applied to the current serving cell, so that the ranking Rs can be increased to the highest ranking. Alternatively, $Q_{Hyst}$ may be considered as a type of offset and a value of the positive infinity may be set to $Q_{Hyst}$ to be applied to the current serving cell.

The predetermined cell to which the infinite offset is applied may be a cell (non-SC-PTM cell) where no MBMS service is provided by the SC-PTM transmission. In this case, the infinite offset may be an offset for decreasing the ranking of a predetermined cell to the lowest. As an example, a case is assumed where a neighboring cell is a non-SC-PTM cell and the UE 100 calculates a ranking $R_n$ of the neighboring cell with the above-mentioned calculation formula (that is, "$R_n = Q_{meas'n} - Qofffset - Qoffset_{temp}$"). In such a case, a value of the positive infinity is set to Qoffset and/or $Qoffset_{temp}$ to be applied to the neighboring cell, so that the ranking $R_n$ can be decreased to the lowest ranking.

Figure 14:
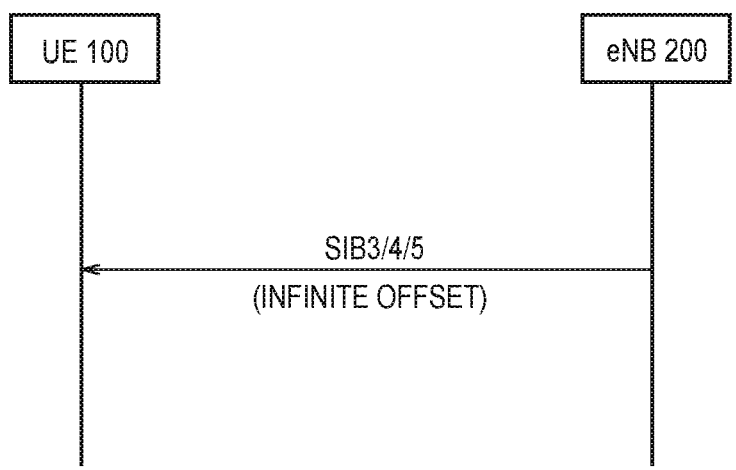
FIG. 14 is a diagram illustrating an SIB according to the first embodiment.

In the first embodiment, the receiver 110 of the UE 100 may receive a system information block (SIB) broadcast from the serving cell. The SIB may include an infinite offset associated with a predetermined cell. The SIB may include an infinite offset associated with a predetermined frequency. Alternatively, the SIB may be an infinite offset not associated with a predetermined cell and frequency. If the infinite offset is not associated with a predetermined cell and frequency, the SIB may include an identifier (a grant flag) indicating that the infinite offset may be applied to an SC-PTM cell. FIG. 14 is a diagram illustrating an SIB according to the first embodiment. As illustrated in FIG. 14, the eNB 200 broadcasts at least one of an SIB type 3 (SIB 3), an SIB type 4 (SIB 4), and an SIB type 5 (SIB 5). The SIB 3 is an SIB including a cell reselection parameter mainly related to a serving cell. The SIB 4 and the SIB 5 are SIBs including a cell reselection parameter mainly related to a neighboring cell. The SIBs 3/4/5 may include at least one set of a cell identifier of a predetermined cell and an offset (infinite offset) to be applied to the predetermined cell. The infinite offset associated with the predetermined cell may be included in the SC-MCCH or may be included in the SIB 20. The infinite offset may be preconfigured for the UE 100.

Figure 15:
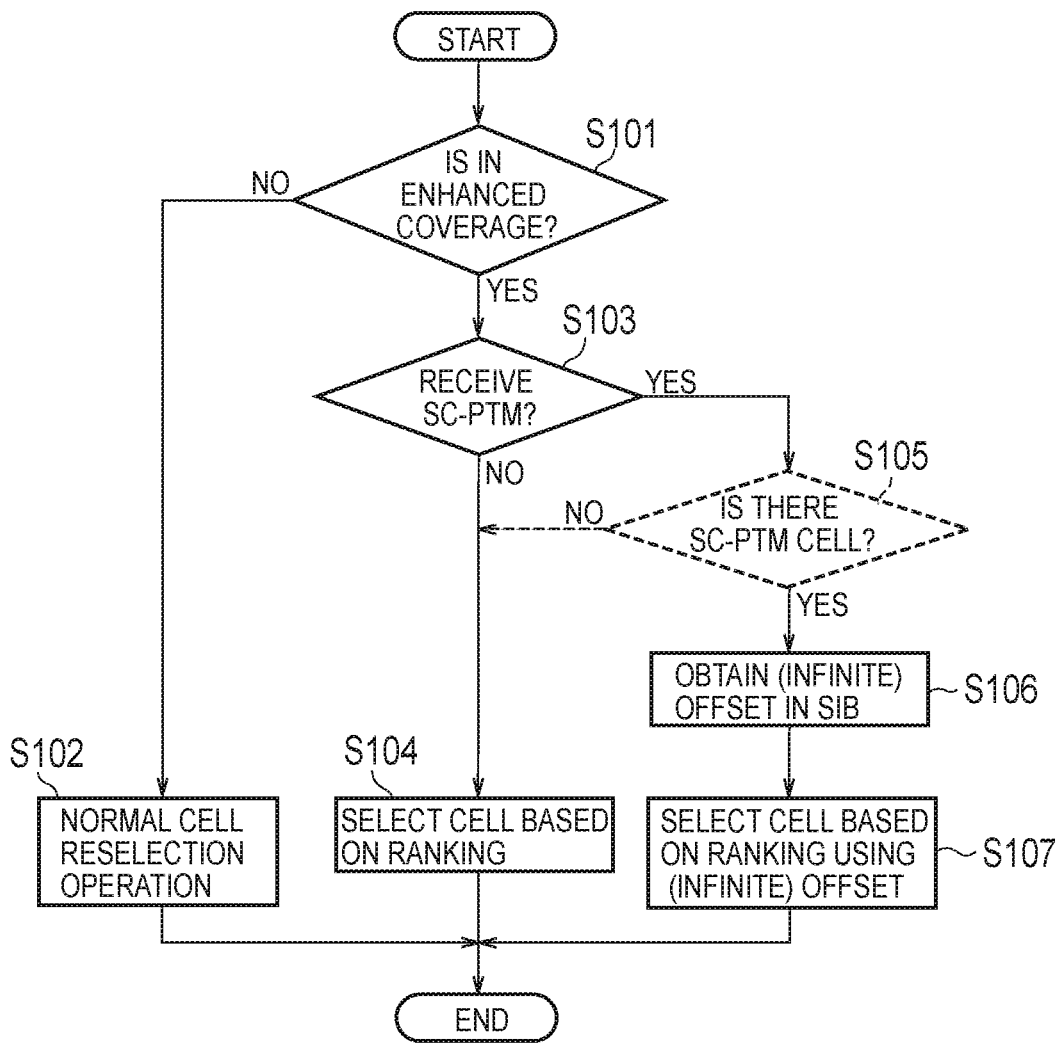
FIG. 15 is a flowchart illustrating an example of an operation flow of a UE according to the first embodiment.

FIG. 15 is a flowchart illustrating an example of an operation flow of the UE 100 according to the first embodiment.

As illustrated in FIG. 15, in step S101, the UE 100 in the RRC idle mode determines whether the enhanced coverage function is required for the UE 100 itself (that is, whether the UE 100 itself is in the enhanced coverage). If the enhanced coverage function is not required for the UE 100 itself (step S101: NO), in step S102, the UE 100 performs a normal cell reselection operation as in the "Outline of cell reselection operation" described above.

If the enhanced coverage function is required for the UE 100 itself (step S101: YES), in step S103, the UE 100 determines whether the UE 100 is receiving or interested in receiving the MBMS service. If the UE 100 is not receiving the MBMS service and is not interested in receiving the MBMS service (step S103: NO), in step S104, the UE 100 uses a ranking to select a cell having the best radio quality. Specifically, the UE 100 applies a ranking using an "S-criteria" or an "R-criteria" for the enhanced coverage to the same frequency (intra-frequency) and another frequency (inter-frequency). In other words, the UE 100 in the enhanced coverage preferentially selects a cell with the best radio quality (reception level) without considering a frequency priority. An operation in this case is similar to the operation where "(B2) The priority of the frequency of the neighboring cell is identical to the priority of the current serving cell" of the "Outline of cell reselection operation". However, in step S104, the UE 100 performs the ranking without using the infinite offset.

If the UE 100 is receiving or interested in receiving the MBMS service (step S103: YES), in step S105, the UE 100 may determine whether a cell where a desired MBMS service is provided by SC-PTM transmission exists in a plurality of cells (the serving cell and the neighboring cell). If "NO" is determined in step S105, the process proceeds to step S104. If "YES" is determined in step S105, the process proceeds to step S106. However, step S105 is not essential, and thus, may be omitted.

In step S106, the UE 100 receives, from the serving cell, the SIB (or the SC-MCCH) including the infinite offset associated with a predetermined cell, and obtains the infinite offset. Step S106 may be executed before step S105. In step S107, the UE 100 selects, as the serving cell, a cell having the highest ranking determined based on the radio quality (reception level) and the offset from among the plurality of cells. As described above, the UE 100 configures the infinite offset as an offset to be applied to a predetermined cell if a predetermined condition for the SC-PTM transmission is satisfied. If there are a plurality of cells having the highest ranking, the UE 100 may select any cell from the plurality of cells having the highest ranking.

Modification of First Embodiment

A modification of the first embodiment will be described with a focus on differences from the first embodiment. In the modification of the first embodiment, an operation after the UE 100 performs the cell reselection operation based on the ranking using the offset will be described. The modification of the first embodiment may not be based on the first embodiment. That is, the offset to be applied to a predetermined cell may not be infinite.

If performing the cell reselection operation based on the ranking using the offset, the UE 100 may select a cell with poor radio quality as the serving cell without selecting a cell with the best radio quality as the serving cell. Under such a premise, if the UE 100 needs to perform unicast communication, the UE may execute a random access procedure on a current serving cell, that is, the cell with poor radio quality. As a result, since the UE 100 establishes an RRC connection with the cell with poor radio quality, the UE 100 may not possibly perform the unicast communication appropriately.

The modification of the first embodiment is a modification aiming to solve such a problem. The receiver 110 of the UE 100 according to the modification of the first embodiment receives an MBMS service provided using SC-PTM transmission while the UE 100 is in an RRC idle mode. The controller 130 of the UE 100 starts a procedure (random access procedure) for transitioning from the RRC idle mode to an RRC connected mode, in response to a necessity for the UE 100 to perform the unicast communication. The controller 130 of the UE 100 performs a cell reselection operation of selecting a cell to be used as the serving cell of the UE 100 from among a plurality of cells at a predetermined timing before the UE 100 starts the random access procedure.

The predetermined timing may be a timing after the UE 100 determines that it is necessary to perform the unicast communication. The controller 130 of the UE 100 may determine that the necessity to perform the unicast communication has occurred, in response to at least one of conditions being satisfied, the conditions including generation of uplink data with a higher priority than the SC-PTM, notification of generation of uplink data or a control signal notified from a higher layer (NAS), and reception of a paging. The predetermined timing may be a timing when or after the UE 100 loses interest in receiving the MBMS service or stops receiving the MBMS service.

The predetermined timing may be a timing at which to determine to perform the random access procedure, a timing immediately before RRC Connection Request (or RRC Connection Resume Request) transmission during the random access procedure, or a timing immediately before a random access preamble transmission.

The controller 130 of the UE 100 performs a cell reselection operation using an offset for raising the ranking of the cell where the MBMS service is provided at a timing before the predetermined timing (see the first embodiment). In other words, the UE 100 performs a cell reselection operation to preferentially select an SC-PTM cell in order to receive the MBMS service in an RRC idle mode. The controller 130 of the UE 100 then performs a cell reselection operation without using the offset at a predetermined timing before starting the random access procedure. In other words, the UE 100 performs a cell reselection operation excluding the above-described offset to select a cell with the best radio quality. It is noted that the offset may take the infinite value as described above, or may take a finite value (for example, an offset value such as 10 dB). Thus, the UE 100 can establish the RRC connection with a cell with the best radio quality.

Figure 16:
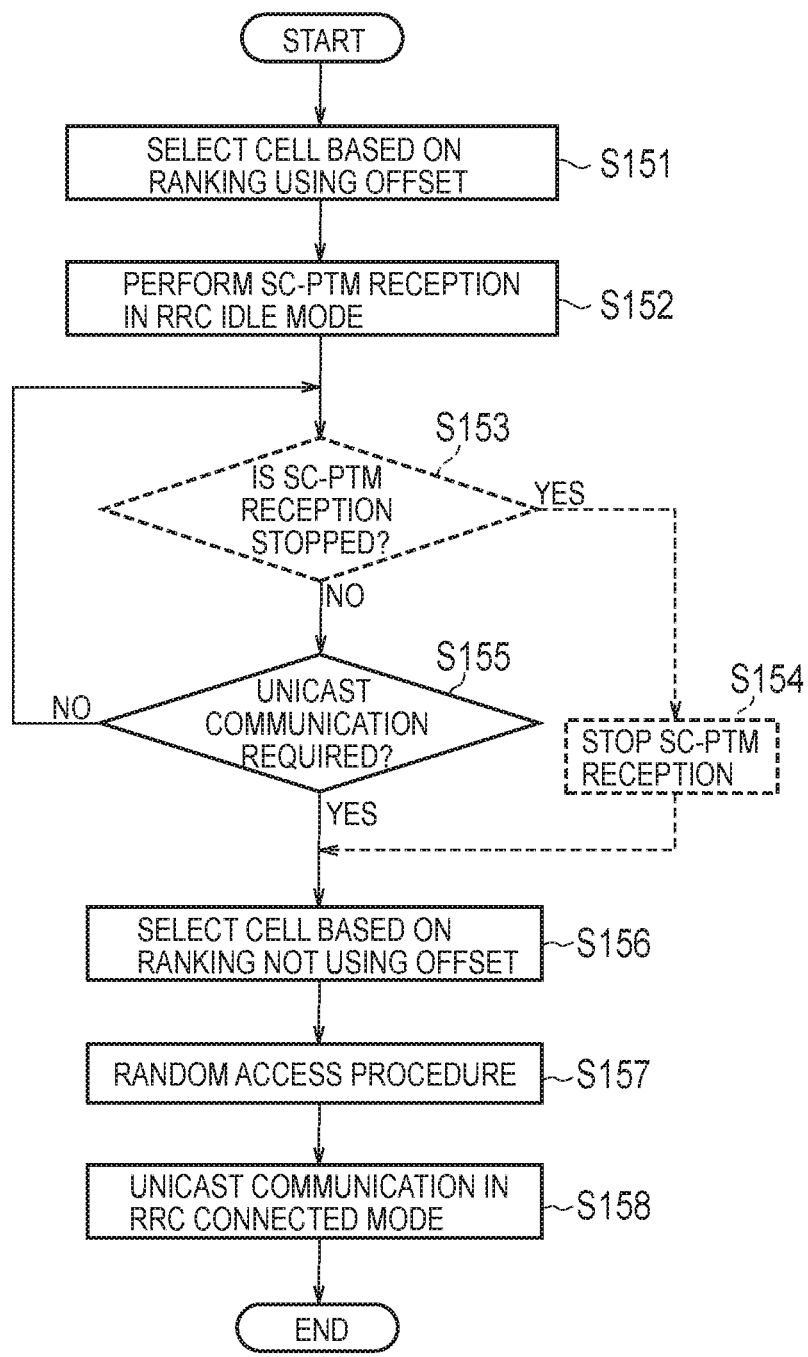
FIG. 16 is a flowchart illustrating an example of an operation flow of the UE according to a modification of the first embodiment.

FIG. 16 is a flowchart illustrating an example of an operation flow of the UE 100 according to the modification of the first embodiment.

In step S151, the UE 100 in an RRC idle mode performs a cell reselection operation based on ranking using an offset for raising the ranking of a cell (SC-PTM cell) where an MBMS service is provided. In step S152, the UE 100 receives the MBMS service provided using SC-PTM transmission while the UE 100 is in the RRC idle mode.

In step S153, the UE 100 may determine whether to cancel the reception of the MBMS service provided using the SC-PTM transmission. In other words, the UE 100 may determine whether the UE 100 is no longer interested in the SC-PTM reception or whether the UE 100 cancels the reception. If canceling the SC-PTM reception (step S153: YES), in step S154, the UE 100 cancels the SC-PTM reception, and advances the process to step S156. If continuing the SC-PTM reception (step S153: NO), the UE 100 advances the process to step S155. It is noted that the processes of step S153 and step S154 are not essential.

In step S155, the UE 100 determines whether it is necessary to perform the unicast communication. If it is not necessary to perform the unicast communication (step S155: NO), the UE 100 returns the process to step S153. If it is necessary to perform the unicast communication (step S155: YES), the UE 100 advances the process to step S156.

In step S156, the UE 100 performs a cell reselection operation based on the ranking not using the offset for raising the ranking of the cell (SC-PTM cell) where the MBMS service is provided. In the cell reselection operation, the UE 100 may measure a radio quality of each of cells again to select a cell. In the cell reselection operation, the UE 100 may exclude the offset from an already held measurement result of each of the cells to select a cell. Specifically, the UE 100 excludes the offset only from a cell to which the offset has been applied. Alternatively, the UE 100 may hold a plurality of tables (measurement results). Each of the tables is a table for the measurement result of each of the cells. The plurality of tables include a measurement result table where the offset is applied, a measurement result table where the offset is not applied, and the like. If the UE 100 saves in advance the measurement result in a table form, the UE 100 may just read the table again without remeasurement and recalculation, and thus, the operation is faster.

In step S157, the UE 100 performs the random access procedure on the cell selected by the cell reselection operation, and transitions from the RRC idle mode to an RRC connected mode. In step S158, the UE 100 performs the unicast communication in the RRC connected mode. Here, the UE 100 may receive the MBMS service received in step S152 by the unicast communication.

Second Embodiment

A second embodiment will be described with a focus on a difference from the first embodiment.

As described above, the UE 100 receives the MBMS service (MBMS data) corresponding to the TMGI in which the UE 100 is interested, based on SC-MTCH-Scheduling-Info in the SC-PTM configuration information, via the SC-MTCH. In the physical layer, after transmitting the PDCCH using the G-RNTI, the eNB 200 transmits the MBMS data via the PDSCH. The SC-MTCH-Scheduling-Info includes a DRX configuration for the SC-MTCH (for example, onDurationTimerSCPTM, drx-InactivityTimersCSPTM, and schedulingPeriodStartOffconfig-uresCPTM). On the other hand, the enhanced coverage function includes repetition for repeatedly transmitting the same signal (Repetition). The eNB 200 repeatedly transmits MPDCCH or NPDCCH (control information), and repeatedly transmits PDSCH (data). Therefore, the eNB 200 desirably configures a DRX cycle in which the repetition is considered, for the UE 100.

The eNB 200 according to the second embodiment provides the MBMS service using the SC-PTM transmission. The controller 230 of the eNB 200 configures the DRX cycle to be used for a DRX operation for the MBMS service, for the UE 100. The transmitter 210 of the eNB 200 performs a first repetition of repeatedly transmitting the control information corresponding to data belonging to the MBMS service, and a second repetition of repeatedly transmitting the data. The controller 230 of the eNB 200 configures, as the DRX cycle, a time equal to or longer than a total of a first period required for the first repetition, a second period required for the second repetition, and a third period required to switch between the first repetition and the second repetition.

Figure 17:
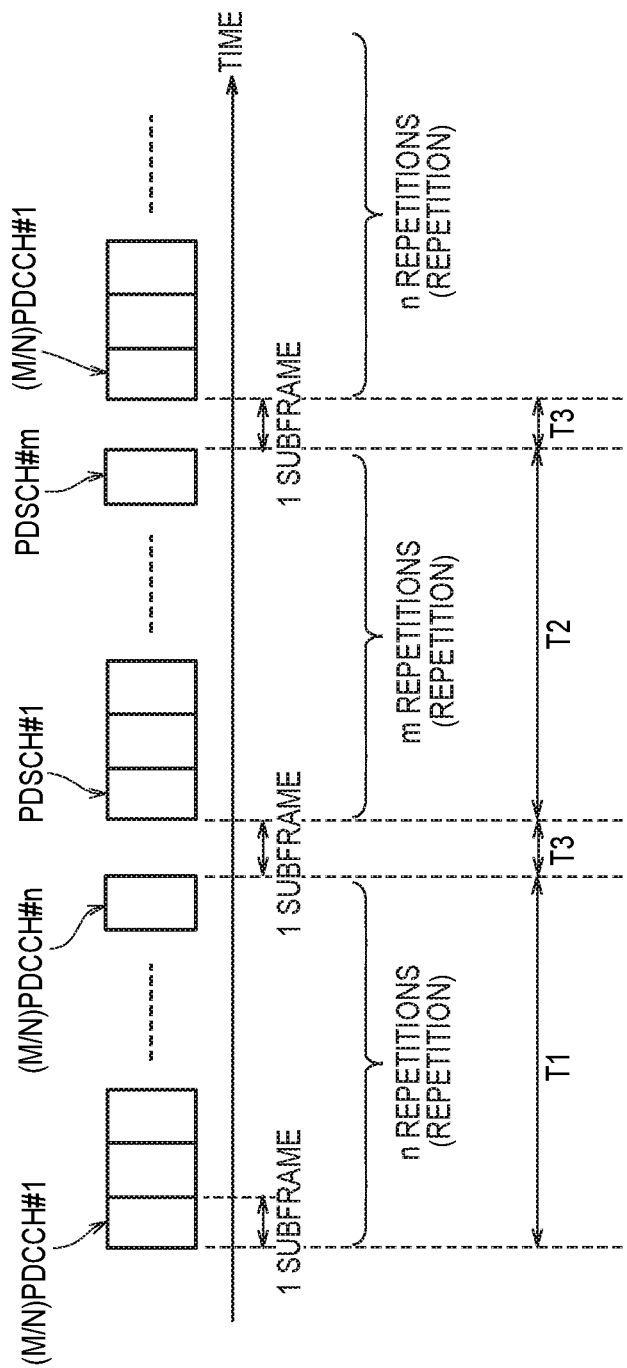
FIG. 17 is a diagram illustrating an example of an operation according to the second embodiment.

FIG. 17 is a diagram illustrating an example of an operation according to the second embodiment. As illustrated in FIG. 17, the eNB 200 uses the SC-MTCH to transmit data belonging to a predetermined MBMS service (here, an MBMS service of TMGI #1) to the UE 100. In a first period T1, the eNB 200 repeatedly transmits MPDCCH or NPDCCH (referred to as "(M/N) PDCCH" as appropriate) n times. Specifically, the eNB 200 performs the repetition of the same signal (control information) by using n consecutive subframes. Then, the eNB 200 repeatedly transmits the PDSCH m times in a second period T2. Specifically, the eNB 200 performs the repetition of the same signal (data) by using m consecutive subframes. One subframe is provided as a third period T3 for switching between the first period T1 and the second period T2. The third period T3 may be a decoding period used by the UE 100 to decode the control information. The third period T3 may be an RF adjustment period used by the UE 100 to switch the frequency. The third period T3 having one subframe may be provided also after the second period T2. It is noted that the one subframe after the second period T2 may not be included in the third period T3.

Under such a premise, the eNB 200 configures, as the DRX cycle, a time equal to or longer than a total of the first period T1, the second period T2, and the third period T3 (one or two subframes), for the UE 100. With such configuration, it is possible to wake up the UE 100 in accordance with the repetition, and therefore, low delay transmission can be performed. In addition, occurrence of unnecessary Active Time (M/NPDCCH monitor) can be prevented while the UE 100 is receiving the (M/N) PDCCH or PDSCH. Further, for example, it is possible to avoid a situation where the Active Time arrives to force monitoring of the (M/N) PDCCH while the UE 100 is receiving the PDSCH. It is noted that if the DRX cycle less than the total of the first period T1, the second period T2, and the third period T3 (one or two subframes) is configured, the UE 100 may consider this configuration as a configuration error.

Modification of Second Embodiment

A modification of the second embodiment will be described with a focus on differences from the second embodiment. In the present modification, a case is mainly assumed where a DRX cycle less than a total of the first period T1, the second period T2, and the third period T3 (one or two subframes) is configured.

The UE 100 according to the modification of the second embodiment receives the MBMS service provided using the SC-PTM transmission. The controller 130 of the UE 100 uses the DRX cycle for the MBMS service to perform a DRX operation of intermittently monitoring the (M/N) PDCCH which transmits the control information corresponding to data belonging to the MBMS service. The receiver 110 of the UE 100 performs a first repeated reception of repeatedly receiving the control information and a second repeated reception of repeatedly receiving the data. The DRX cycle includes a monitoring period requiring monitoring of the (M/N) PDCCH and a non-monitoring period not requiring the monitoring of the (M/N) PDCCH. The monitoring period corresponds to the Active Time. The controller 130 of the UE 100 controls not to monitor the (M/N) PDCCH even during the monitoring period while performing the second repeated reception (that is, during the PDSCH reception). In other words, for the currently received TMGI, the UE 100 is exempted from monitoring of the (M/N) PDCCH if the UE 100 is receiving the PDSCH.

Figure 18:
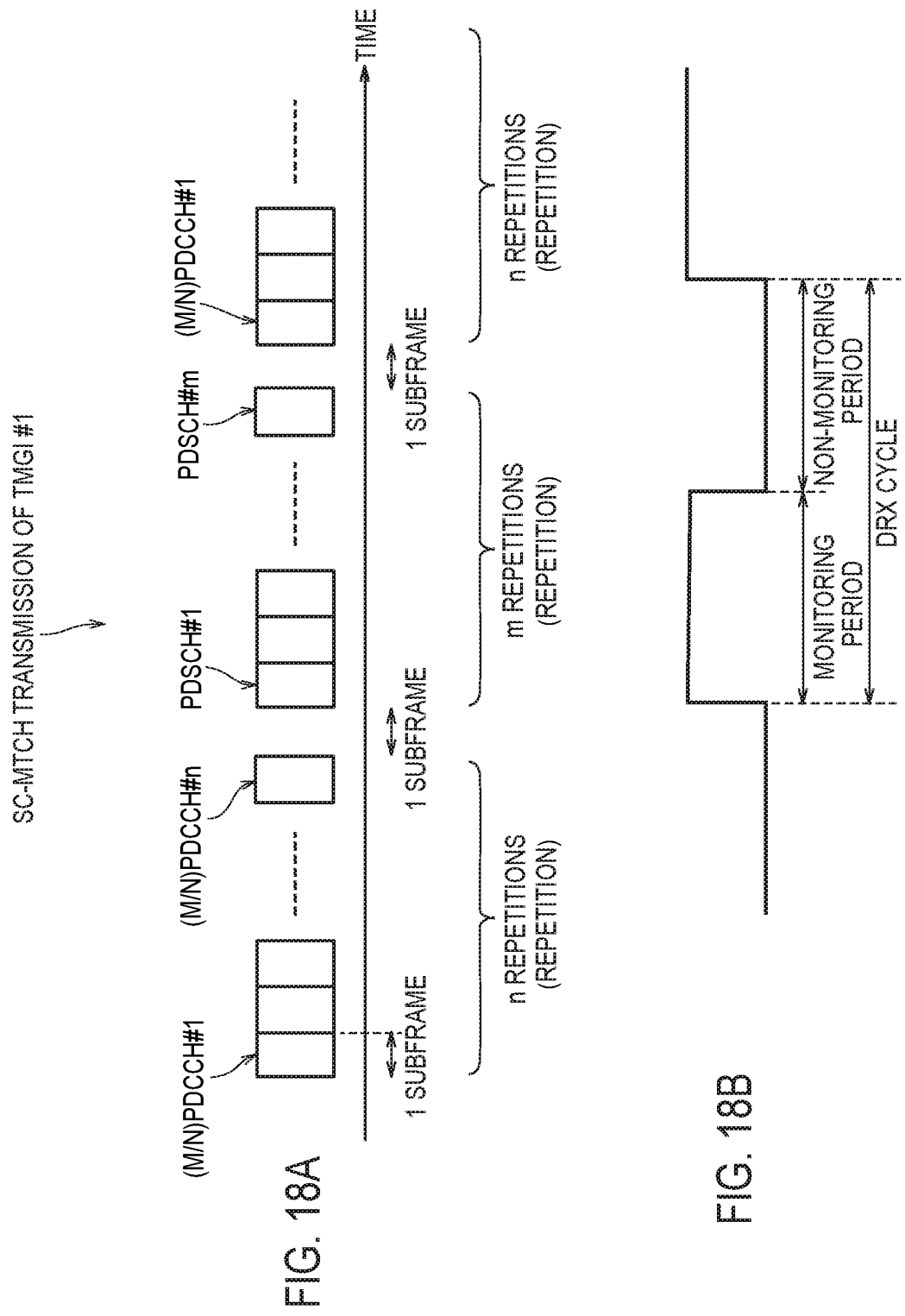
FIG. 18A and FIG. 18B are diagrams each illustrating an example of an operation according to a modification of the second embodiment.

FIG. 18 is a diagram illustrating an example of an operation according to the modification of the second embodiment. As illustrated in FIG. 18, the eNB 200 uses the SC-MTCH to transmit data belonging to a predetermined MBMS service (here, the MBMS service of TMGI #1) to the UE 100. Specifically, the eNB 200 repeatedly transmits the (M/N) PDCCH n times and repeatedly transmits the PDSCH m times. Here, the UE 100 is configured with a DRX cycle shorter than the DRX cycle as described in the second embodiment. Therefore, a monitoring period occurs while the UE 100 is receiving the PDSCH. In such a case, the UE 100 receiving the PDSCH corresponding to a predetermined MBMS service is exempted from monitoring the (M/N) PDCCH corresponding to the predetermined MBMS service. Thus, the UE 100 can perform the PDSCH reception during the monitoring period. It is noted that the UE 100 may perform the (M/N) PDCCH reception, if the monitoring period occurs during the (M/N) PDCCH reception.

Here, although the (M/N) PDCCH and the PDSCH of the same MBMS service (the same TMGI) are described, the UE 100 may receive a plurality of MBMS services (for example, TMGI #1 and TMGI #2). If the monitoring period corresponding to another MBMS service (TMGI #2) occurs during reception of the PDSCH corresponding to a predetermined MBMS service (TMGI #1), the UE 100 may select one of the PDSCH reception and the (M/N) PDCCH reception. For example, the UE 100 may select an MBMS service (TMGI) more prioritized by a user (application). If the PDSCH reception is selected, the UE 100 performs the PDSCH reception. On the other hand, if the (M/N) PDCCH reception is selected, the UE 100 switches from the PDSCH reception to the (M/N) PDCCH reception.

Third Embodiment

A third embodiment will be described with a focus on a difference from the first and second embodiments. The third embodiment is an embodiment for a stop indication in which the eNB 200 notifies the UE 100 of a stop of providing the MBMS service. Such a stop indication may be referred to as "RAN level stop indication". Specifically, when transmitting the data belonging to the MBMS service to the UE 100 over the SC-MTCH, the eNB 200 notifies the UE 100 of the stop of providing the MBMS service. The stop indication may be included in the control information (DCI) to be transmitted over the (M/N) PDCCH. The stop indication may be included in a MAC control element (MAC CE) to be transmitted over the PDSCH. Below, a case is mainly assumed where the stop indication is transmitted by the MAC CE, but the stop indication may be transmitted by control information (DCI). The stop indication may be included in an RRC message.

If the UE 100 fails to receive the stop indication, the UE 100 will wastefully attempt to receive the MBMS service that is stopped from being provided, which may cause unnecessary power consumption. The third embodiment is an embodiment aiming to solve such a problem.

The eNB 200 according to the third embodiment provides the MBMS service by using the SC-PTM transmission. The transmitter 210 of the eNB 200 transmits data belonging to the MBMS service to the UE 100 by using the SC-MTCH. The controller 230 of the eNB 200 determines to stop the provision of the MBMS service. The transmitter 210 of the eNB 200 transmits, to the UE 100, the stop indication regarding the stop of providing the MBMS service a plurality of times. If the stop indication is transmitted to the UE 100 a plurality of times, the UE 100 can receive the stop indication more reliably than when the UE 100 transmits the stop indication only once.

Figure 19:
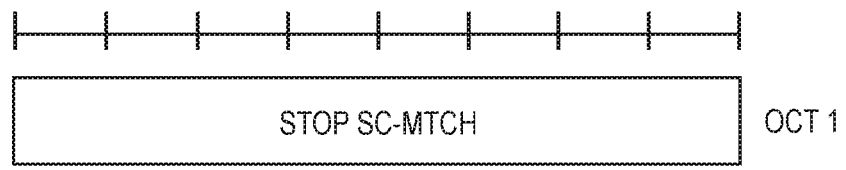
FIG. 19 is a diagram illustrating a case where a stop indication is transmitted by an MAC CE according to a third embodiment.

The transmitter 210 of the eNB 200 transmits, at least once, the stop indication indicating that the provision of the MBMS service (MBMS data) is stopped before stopping the provision of the MBMS service. The stop indication may include time information indicating a time until the provision of the MBMS service is stopped. The time information may be information in which the time until an end of data transmission is expressed by the remaining transmission count of the SC-MTCH. The remaining transmission count of the SC-MTCH may be the transmission count in no consideration of the repetition in the physical layer. The remaining transmission count of the SC-MTCH may be the transmission count in consideration of the repetition. The time information may be information in which the time until the end of data transmission is expressed by the number of subframes. If the stop indication is transmitted plurality of times before stopping the provision of the MBMS service, a remaining time will decrease as the provision stop time of the MBMS service approaches. FIG. 19 is a diagram illustrating a case where the stop indication is transmitted by the MAC CE. The time information is included in the MAC CE. As illustrated in FIG. 19, the MAC CE includes a one-octet stop indication. The stop indication includes the time information indicating the time until the provision of the MBMS service is stopped.

After stopping the provision of the MBMS service, the transmitter 210 of the eNB 200 may further transmit, to the UE 100, the stop indication indicating that the provision of the MBMS service is stopped. The stop indication may be configured to be distinguishable from the stop indication before stopping the provision of the MBMS service. The stop indication may be transmitted alone without the MBMS data. For example, the MAC CE including the stop indication corresponding to a predetermined MBMS service is transmitted in a monitoring period corresponding to the predetermined MBMS service.

The transmitter 210 of the eNB 200 may repeatedly transmit the stop indication by performing the repetition of the physical channel corresponding to the SC-MTCH. The physical channel may be the (M/N) PDCCH or the PDSCH. The repetition count of the physical channel used to transmit the stop indication may be greater than the repetition count of the physical channel not used to transmit the stop indication. Alternatively, only the physical channel used to transmit the stop indication may be repeatedly transmitted, and the repetition may not be applied to the physical channel not used to transmit the stop indication.

FIG. 20 is a flowchart illustrating an example of an operation according to the third embodiment. Here, three operation examples (operation examples 1 to 3) will be described. The PDCCH illustrated in FIG. 20 means the (M/N) PDCCH. The SC-MTCH illustrated in FIG. 20 means the PDSCH corresponding to the SC-MTCH. The SC-MCCH stop timing illustrated in FIG. 20 means a timing at which the provision of the MBMS service is stopped. The eNB 200 performs the repetition of each of the (M/N) PDCCH and the PDSCH. One SC-MTCH transmission is comprised of an (M/N) PDCCH repetition and a PDSCH repetition following the (M/N) PDCCH repetition in the physical layer.

As illustrated in FIG. 20(*a*), in the operation example 1 (Option 1), the repetition count of the PDSCH to be used to transmit the stop indication (Stop ind) is greater than the repetition count of the PDSCH not to be used to transmit the stop indication. For example, the repetition count of the PDSCH not to be used to transmit the stop indication is three. The repetition count of the PDSCH to be used to transmit the stop indication is five. FIG. 20(*a*) illustrates an example in which the repetition count of the (M/N) PDCCH to be used to transmit the stop indication (Stop ind) is also increased. Further, an example of transmitting the stop indication at the time of a final SC-MTCH transmission is illustrated. In the operation example 1 (Option 1), the eNB 200 may notify the UE 100, over the SC-MCCH, of a time position of the SC-MTCH in which the repetition count is also increased.

As illustrated in FIG. 20 (*b*), in the operation example 2 (Option 2), the eNB 200 transmits the stop indications a plurality of times before stopping the provision of the MBMS service. Each of the stop indications includes the time information in which the time until the end of the data transmission is expressed by the remaining transmission count of the SC-MTCH.

As illustrated in FIG. 20(*c*), in the operation example 3 (Option 3), the eNB 200 transmits the stop indication indicating that the provision of the MBMS service is stopped after stopping the provision of the MBMS service. FIG. 20(*c*) illustrates an example in which the stop indication is transmitted alone without the MBMS data.

Other Embodiments

In the above-described embodiments, the MBMS scenario using the SC-PTM transmission is mainly assumed, but an MBMS scenario using MBSFN transmission may also be assumed. As an example, in the above-described embodiments, the SC-PTM transmission may be replaced with the MBSFN transmission, the SC-MCCH may be replaced with the MCCH, and the SC-MTCH may be replaced with the MTCH.

Each of the above-described embodiments may be implemented independently; two or more embodiments may be combined and implemented. For example, a part of the process according to one embodiment may be added to another embodiment. Alternatively, a part of the process according to one embodiment may be replaced with a part of a configuration of another embodiment.

In the above-described embodiments, a delivery of firmware is assumed as the MBMS service. However, an MBMS service such as a group message delivery, a group chat message delivery, a delivery of a virus definition file, a scheduled update file delivery such as a weather forecast, an unscheduled file delivery such as a news bulletin, a night-time file delivery (off peak delivery) such as a video content, an audio/video streaming delivery, a telephone/video phone (group communication), a live video delivery, and a radio audio delivery may be assumed.

A program for causing a computer to execute each process performed by the UE 100 and the eNB 200 may be provided. Further, the program may be recorded on a computer-readable medium. If the computer-readable medium is used, it is possible to install the program in a computer. Here, the computer-readable medium recording therein the program may be a non-transitory recording medium. The non-transitory recording medium is not particularly limited; the non-transitory recording medium may include a recording medium such as a CD-ROM or a DVD-ROM, for example. A chip set may be provided which includes: a memory in which a program for performing each process performed by the UE 100 and the eNB 200 is stored; and a processor for executing the program stored in the memory.

In the above-described embodiments, the LTE system is exemplified as the mobile communication system. However, the present disclosure is not limited to the LTE system. The present disclosure may be applied to a mobile communication system other than the LTE system.

[Supplementary Note]

1. Introduction

In this supplementary note, the issues being concerned are discussed.

2. Discussion (2.1. RAN Level Stop Indication)

Discussion point 1 was that "Companies are invited to provide their views on how to indicate the RAN-level stop for SC-PTM service in NB-IoT and FeMTC". As the rapporteur summarized, the visible alternatives to carry RAN level stop indication are DCI of SC-MCCH scheduling and MAC CE.

Regarding DCI, it's conceptually aligned with the 2-bit notification for on-going service which RAN2 agreed, i.e., "whether the configuration of the SC-MTCH will be changed in next MP" and "whether the new services are due to start in next MP". The 1-bit indication in DCI may be beneficial from the overhead point of view, but the 1-bit does need to be transmitted even when the indication is not necessary, i.e., the defined bit is in every PDCCH and every repetition. However, the drawback of this option is the potential impact to RAN1.

Regarding MAC CE, it's seen as the straightforward solution since there is already the similar MAC CE for MBSFN, i.e., (Extended) MCH Scheduling Information (MSI). The benefit of this option is flexibility from the perspective of scalability, e.g., no scheduling of MAC CE in SC-MTCH when unnecessary, ability of (future) extensions and so on. However, the signalling overhead may be of concern, i.e., the byte-aligned MAC SDU and corresponding MAC sub-header.

Observation 1: There are two visible alternatives for RAN level stop indication, 1-bit in DCI or MAC CE.

Before deciding on how the stop indication should be provided, it's worth discussing whether RAN level stop indication is provided only once or multiple times, wherein the 1-bit option seems to imply the "one-shot" indication (excluding the PDCCH/PDSCH repetitions for Enhanced Coverage) that is likely provided in the last SC-MTCH transmission(s). However, it should be assumed that there is no guarantee the UE can receive any of the SC-MTCH transmissions including the last one with the stop indication, due to e.g., temporally bad radio conditions and/or the lack of feedback. If such a one-shot indication is assumed, the UE may continue to monitor SC-MTCH until the next SC-MCCH modification boundary (i.e., to remove the corresponding configuration from SC-MCCH), even though the SC-MTCH transmission has already ended. It can be a serious problem considering the SC-MCCH modification period is extended and power consumption is critical for such UEs (i.e., FeMTC/eNB-IoT). To avoid such an undesirable condition, the eNB may provide the repetition of RAN level stop indication.

Observation 2: The UE, which cannot receive RAN level stop indication, will need to continue SC-MTCH monitoring, even if the SC-MTCH transmissions have already stopped.

Proposal 1: RAN2 should discuss whether the repetition of RAN level stop indication is necessary.

If Proposal 1 is acceptable, the three options could be considered for the repetition of RAN level stop indication as follows (refer to FIG. 20);

Option 1: The number of PDCCH/PDSCH repetitions (for Enhanced Coverage) is increased only for SC-MTCH with RAN level stop indication;

This option reuses the existing repetition mechanism for Enhanced Coverage; that is the eNB increases number of PDCCH/PDSCH repetitions for SC-MTCH only when it includes RAN level stop indication. The benefit of this option is that no standard impact is expected, e.g., the maximum number of repetitions with relatively larger value can be configured in advance without further specification change. The drawback may be unnecessary repetition of payload and a sort term repetition.

Option 2: RAN level stop indication is repeatedly provided over several SC-MTCHs until it stops;

This option assumes RAN level stop indication is provided in multiple SC-MTCH occasions, e.g., (n–2), (n–1) and (n), whereby "n" means the last SC-MTCH transmission with the stop indication. The benefit is that a better time-domain diversity gain is expected by means of relatively long term repetition. The drawback is the UE needs to know when the SC-MTCH actually stops, so some sort of "count-down" mechanism is necessary which may be similar to the existing "Stop MTCH" in MSI, whereby "Stop MTCH" was introduced for the other purpose, i.e., UE's internal preparation for service continuity.

Option 3: RAN level stop indication is repeatedly provided after SC-MTCH stops.

This option assumes RAN level stop indication is provided even after the payload transmission ends, i.e., in the remaining SC-MTCH scheduling periods until the next SC-MCCH modification period. The benefit is a good diversity gain similar to Option 2, and there is no need for the "count-down" mechanism. The drawback is the signalling overhead that may be increased due to the repetition of M/NPDCCH necessary for the RAN level stop indication.

Based on the considerations above, Option 2 seems to provide the most effective way to improve the reliability of RAN level stop indication reception, while it may be left up to NW implementation which option is used in more than one option is allowed. In this sense, the MAC CE discussed in Observation 1 is slightly preferable since it could potentially cover all options above and even for the case when repetition of stop indication is not provided (refer to FIG. 19).

Proposal 2: RAN2 should agree to use MAC CE for RAN level stop indication.

Proposal 3: RAN2 should discuss whether the "count-down" mechanism is necessary in RAN level stop indication, in order to allow repetition of RAN level stop indication.

(2.2. Ranking-Based Cell Reselection)

(2.2.1. Offset)

It was agreed that "For feMTC, for UE in enhanced coverage, an offset to SC-PTM cells in ranking based cell reselection is used if SC-PTM cell exists and UE is receiving or interested to receive an MBMS service" and "For NB-IoT, an offset to SC-PTM cells in ranking based cell reselection is used if SC-PTM cell exists and UE is receiving or interested to receive an MBMS service". In addition, it was discussed how the offset should be provided. But the value range of the offset has not been discussed.

According to the discussion, it is commented that "Option1 is a similar way and allows some flexibility to the network to configure the cell reselection criterion, such as a small offset to avoid that UE reselects the SC-PTM cell which has low RSRP regardless of other non-SC-PTM cells which has much higher RSRP." However, it's still unclear how the "small offset" works.

For example, if the UE is located in Enhanced Coverage on SC-PTM layer and also close to a cell on non-SC-PTM layer (as illustrated in FIG. 13), the UE will likely reselect the cell on non-SC-PTM layer when the offset is not configured. Even if it's configured, the question is how much offset would work for the intended result of cell reselection procedure, i.e., 5 dB, 10 dB or 20 dB? Regardless of the value selected, it's impossible to prevent all the UEs from reselecting a cell on non-SC-PTM layer under all scenarios, i.e., since it's matter of probability where the UE is located and how the cells are configured. Consequently, UEs that ends up reselecting a cell on the non-SC-PTM layer will need to establish RRC Connection to acquire the MBMS service of interest, i.e., via unicast, which is undesirable from the UE power consumption perspective and may potentially increase NW congestion due to massive number of MTC devices e.g., for IoT. Although FIG. 13 depicts the inter-frequency case for simplicity, the scenario is also applicable to the intra-frequency case wherein the condition becomes even more serious.

So, the proponents of ranking-based cell reselection have to clarify the value range of the offset.

Observation 3: It's unclear how much of an offset needs to be defined.

In Rel-13 the UEs should be allowed to prioritize SC-PTM cells as much as possible, to bypass the ranking criteria set forth by the eNB since the reception of SC-PTM transmission was considered to be of higher priority. But NB-IoT UEs don't have the priority handling procedure.

As discussed, it is considered one of solutions could be considered to allow the configuration of (minus) infinity value as one of the offset values. With this configuration, it can be ensured that all UEs will be able reselect the cell on SC-PTM layer as long as a suitable cell exists, even if it's an NB-IoT-UE. So, the operator can allow UEs to prioritize SC-PTM within the constraint of the ranking procedure. Therefore, at least the (minus) infinity value is worth introducing as a configuration option of the offset.

Proposal 4: RAN2 should agree to have the configuration option with (minus) infinity, for the offset of ranking-based cell reselection.

(2.2.2. Cell Reselection Before RRC Connection Request)

In Rel-13, the ranking-based cell reselection was introduced even for intra-frequency case. It's quite useful for unicast, since the UE that reselects a cell that offers normal coverage minimizes the resource consumption after transitioning to RRC Connected with e.g., link adaptation. It works as a "static" scenario.

In Rel-14, it's extended for SC-PTM with the offset, which improves/ensures the UE reselects a cell providing SC-PTM as much as possible.

It could be considered as a "dynamic" scenario that the UE currently receiving SC-PTM from the cell which is not suitable for unicast, e.g., the UE is in Enhanced Coverage of this cell. When MT/MO call occurs, the UE would stop receiving SC-PTM and initiate RRC Connection Request, since SC-PTM is only supported in IDLE.

It may be expected that the UE would have already reselected the best ranked cell for unicast if it's no longer interested in SC-PTM, i.e., stop receiving SC-PTM. However, it should be considered how the UE should behave in case the UE decides to initiate Unicast service while SC-PTM is still ongoing, and while the UE is within the Enhanced Coverage. If the offset is still applied this may lead to the problem that the UE may end up initiating Unicast service on a less than optimum cell. Therefore, preferably, the UE should perform the cell reselection without the offset just before RRC Connection Request. However, in the "dynamic" scenario after the UE's no longer interested in receiving SC-PTM, since the cell reselection is somewhat a slow process, e.g., in terms of measurements, the UE would not be expected to acquire the most suitable cell quickly. Considering MBMS in Enhanced Coverage is first discussed in Rel-14, RAN2 should discuss whether to specify the intended UE behaviour for reselection just before initiating RRC Connection Request. Note that some UE implementation may perform such a fast re-evaluation assuming it only removes the offset.

Proposal 5: RAN2 should discuss whether to define the UE behaviour for cell reselection immediately after it stops receiving SC-PTM but just before RRC Connection Request.

(2.3. MBMS Interest Indication)

In Rel-14, SC-PTM reception is supported only in IDLE. It means that the UE in Connected needs to be released to IDLE, in order to receive MBMS service of interest via SC-PTM. However, the eNB doesn't know whether the UE needs to prioritize SC-PTM over unicast. It may result in e.g., additional UE battery consumption and/or NW congestion, although it may be assumed the UE, especially in eNB-IoT, typically stays in Connected for a very short time.

To make sure the optimal RRC state control for FeMTC/eNB-IoT, the existing MBMS Interest Indication could be reused, i.e., with mbms-Priority, which was intended for mobility control in the legacy releases. For example, the eNB may or may not decide to release RRC Connection when it receives the UE's prioritization between SC-PTM and unicast. So, MBMS Interest Indication should be supported in FeMTC/eNB-IoT.

Proposal 6: RAN2 should agree that MBMS Interest Indication is supported in FeMTC and eNB-IoT.

If Proposal 6 is agreeable, it could be achieved with editorial extensions, i.e., to capture SIB15-NB and SIB20-NB into the existing procedural specification.

(2.4. M/NPDCCH Configuration)

Currently, MPDCCH configuration is configured via dedicated signalling, i.e., as part of EPDCCH-Config and NPDCCH configuration is also, i.e., NPDCCH-ConfigDedicated-NB. However, it does not work since SC-PTM may be received only by UEs in RRC IDLE. So, these configurations need to be broadcasted for SC-PTM reception.

As suggested in the current running CR of TS 36.331, M/NPDCCH configuration should be broadcasted in SIB20 for SC-MCCH, and in SC-MCCH for SC-MTCH.

Proposal 7: RAN2 should agree to introduce MPDCCH/NPDCCH configurations are provided in SIB20 and SC-MCCH, for reception of SC-MCCH and SC-MTCH respectively.

The invention claimed is:

1. A user equipment for receiving a Multimedia Broadcast Multicast Service (MBMS) service provided using Single Cell Point-To-Multipoint (SC-PTM) transmission, comprising:
   a processor and a memory coupled to the processor, wherein the processor is configured to
     perform a cell reselection operation of selecting a cell to be used as a serving cell of the user equipment while the user equipment is in a Radio Resource Control (RRC) idle mode,
     in the cell reselection operation, select, as the serving cell, a cell having a highest ranking determined based on a radio quality and an offset from among a plurality of cells,
     determine that the user equipment is in an enhanced coverage of a cell if a first cell selection criterion S for normal coverage is not fulfilled for the cell and a second cell selection criterion S for enhanced coverage is fulfilled for the cell,
     in the cell reselection operation, when determining that the user equipment is in the enhanced coverage of a cell, use an infinite offset as the offset to be applied to a cell where the MBMS service is provided by the SC-PTM transmission, in response to a predetermined condition for the SC-PTM transmission being satisfied.

2. The user equipment according to claim 1, wherein the predetermined condition includes the user equipment receiving or being interested in receiving the MBMS service.

3. The user equipment according to claim 1, wherein
   the processor is configured to receive a system information block broadcast from the serving cell, and
   the system information block includes information for the user equipment to determine whether to use the infinite offset when the user equipment is in the enhanced coverage.

4. The user equipment according to claim 1, wherein the processor is configured to when the user equipment is in the enhanced coverage, perform the cell reselection without considering frequency priorities.

5. An apparatus provided in a user equipment for receiving a Multimedia Broadcast Multicast Service (MBMS) service provided using Single Cell Point-To-Multipoint (SC-PTM) transmission, the apparatus comprising:
   a processor and a memory coupled to the processor, the processor is configured to
     perform a cell reselection operation of selecting a cell to be used as a serving cell of the user equipment while the user equipment is in a Radio Resource Control (RRC) idle mode,
     in the cell reselection operation, select, as the serving cell, a cell having a highest ranking determined based on a radio quality and an offset from among a plurality of cells,
     determine that the user equipment is in an enhanced coverage of a cell if a first cell selection criterion S for normal coverage is not fulfilled for the cell and a second cell selection criterion S for enhanced coverage is fulfilled for the cell, and in the cell reselection operation, when determining that the user equipment is in the enhanced coverage of a cell, use an infinite offset as the offset to be applied to a cell where the MBMS service is provided by the SC-PTM transmission, in response to a predetermined condition for the SC-PTM transmission being satisfied.

6. A method for use in a user equipment for receiving a Multimedia Broadcast Multicast Service (MBMS) service provided using Single Cell Point-To-Multipoint (SC-PTM) transmission, comprising performing a cell reselection operation of selecting a cell to be used as a serving cell of the user equipment while the user equipment is in a Radio Resource Control (RRC) idle mode, in the cell reselection operation, selecting, as the serving cell, a cell having a highest ranking determined based on a radio quality and an offset from among a plurality of cells, determining that the user equipment is in an enhanced coverage of a cell if a first cell selection criterion S for normal coverage is not fulfilled for the cell and a second cell selection criterion S for enhanced coverage is fulfilled for the cell, and in the cell reselection operation, when determining that the user equipment is in the enhanced coverage of a cell, using an infinite offset as the offset to be applied to a cell where the MBMS service is provided by the SC-PTM transmission, in response to a predetermined condition for the SC-PTM transmission being satisfied.

* * * * *